US012600143B2

(12) United States Patent
Oya et al.

(10) Patent No.: US 12,600,143 B2
(45) Date of Patent: Apr. 14, 2026

(54) CARTRIDGE AND PRINTING SYSTEM

(71) Applicant: SEIKO EPSON CORPORATION, Tokyo (JP)

(72) Inventors: Shun Oya, Kiso-machi (JP); Akihiko Maruyama, Matsumoto (JP); Takumi Nagashima, Matsumoto (JP); Yoshihiro Koizumi, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 196 days.

(21) Appl. No.: 18/568,497

(22) PCT Filed: Jun. 13, 2022

(86) PCT No.: PCT/JP2022/023593

§ 371 (c)(1),
(2) Date: Dec. 8, 2023

(87) PCT Pub. No.: WO2022/264958

PCT Pub. Date: Dec. 22, 2022

(65) Prior Publication Data

US 2025/0121602 A1 Apr. 17, 2025

(30) Foreign Application Priority Data

Jun. 18, 2021 (JP) ................................ 2021-101343

(51) Int. Cl.
*B41J 2/175* (2006.01)

(52) U.S. Cl.
CPC ....... *B41J 2/17553* (2013.01); *B41J 2/17513* (2013.01); *B41J 2/17523* (2013.01)

(58) Field of Classification Search
CPC ......................... B41J 2/17553; B41J 2/17513; B41J 2/17523; B41J 2/1753; B41J 2/1752
USPC ........................................................... 347/86
See application file for complete search history.

(56) References Cited

U.S. PATENT DOCUMENTS 9,527,298 B2 12/2016 Nakata
11,198,298 B2 12/2021 Aoki et al.
2008/0239036 A1* 10/2008 Hattori ................ B41J 2/17553 347/86
2014/0240411 A1 8/2014 Oya
2016/0059575 A1 3/2016 Nakata
(Continued)

FOREIGN PATENT DOCUMENTS

CN 104015487 A 9/2014
CN 105383180 A 3/2016
JP H08-300671 A 11/1996
(Continued)

OTHER PUBLICATIONS

Jul. 12, 2022 International Search Report issued in International Patent Application No. PCT/JP2022/023593.

*Primary Examiner* — Jason S Uhlenhake
*Assistant Examiner* — Alexander D Shenderov
(74) *Attorney, Agent, or Firm* — Oliff PLC

(57) ABSTRACT

A cartridge mounted on a cartridge mounting section of a printing device having a liquid introduction section for receiving a liquid, the cartridge includes a liquid accommodating section configured to accommodate the liquid, a bottom wall on which a liquid supply section that is coupled to the liquid introduction section and supplies the liquid is disposed, and a rib formed at the bottom wall.

14 Claims, 22 Drawing Sheets

(56) References Cited

U.S. PATENT DOCUMENTS

| | | | |
|---|---|---|---|
| 2020/0276821 | A1 | 9/2020 | Aoki et al. |
| 2022/0169030 | A1 | 6/2022 | Maruyama et al. |

FOREIGN PATENT DOCUMENTS

| | | | |
|---|---|---|---|
| JP | 2018-058291 | A | 4/2018 |
| JP | 2019-025794 | A | 2/2019 |
| JP | 2022-086229 | A | 6/2022 |
| WO | 2019/098287 | A1 | 5/2019 |

* cited by examiner 6
67,674
4,4K
47
442
644b
642
644,448
497
900
910
677
642a
697
644a
699
642b
450
610,613
62
698
Z
Y
X

CARTRIDGE AND PRINTING SYSTEM

TECHNICAL FIELD

The present disclosure relates to a cartridge and a printing system.

BACKGROUND ART

In the related art, a printing system including a cartridge provided with a liquid supply port and a printing device in which the cartridge is detachably mounted is known (for example, PTL 1).

CITATION LIST

Patent Literature

PTL 1: International Publication No. 2019-098287

SUMMARY OF INVENTION

Technical Problem

When the vicinity of the liquid supply port is damaged by an external impact or the like when the cartridge is handled, there is a concern that unexpected ink leakage occurs. Further, even in a configuration in which two operations of horizontally inserting the cartridge into a cartridge holder of the printing device and then rotationally moving the cartridge in the gravity direction to mount the cartridge on the cartridge holder are continuously performed, when positional deviation in which a position of the cartridge is deviated from a predetermined position occurs in a case of performing each operation, there is a concern that erroneous mounting of the cartridge is caused, which may cause unexpected ink leakage.

Solution to Problem (1) According to a first aspect of the present disclosure, there is provided a cartridge mounted on a cartridge mounting section of a printing device having a liquid introduction section for receiving a liquid. The cartridge includes a liquid accommodating section configured to accommodate the liquid, a bottom wall on which a liquid supply section that is coupled to the liquid introduction section and supplies the liquid is disposed, and a rib formed at the bottom wall.

(2) According to a second aspect of the present disclosure, there is provided a printing system. The printing system includes the cartridge of the above aspect, and a printing device having the cartridge mounting section.

DESCRIPTION OF EMBODIMENTS

A. EMBODIMENT

A-1. Configuration of Printing System

Figure 1:
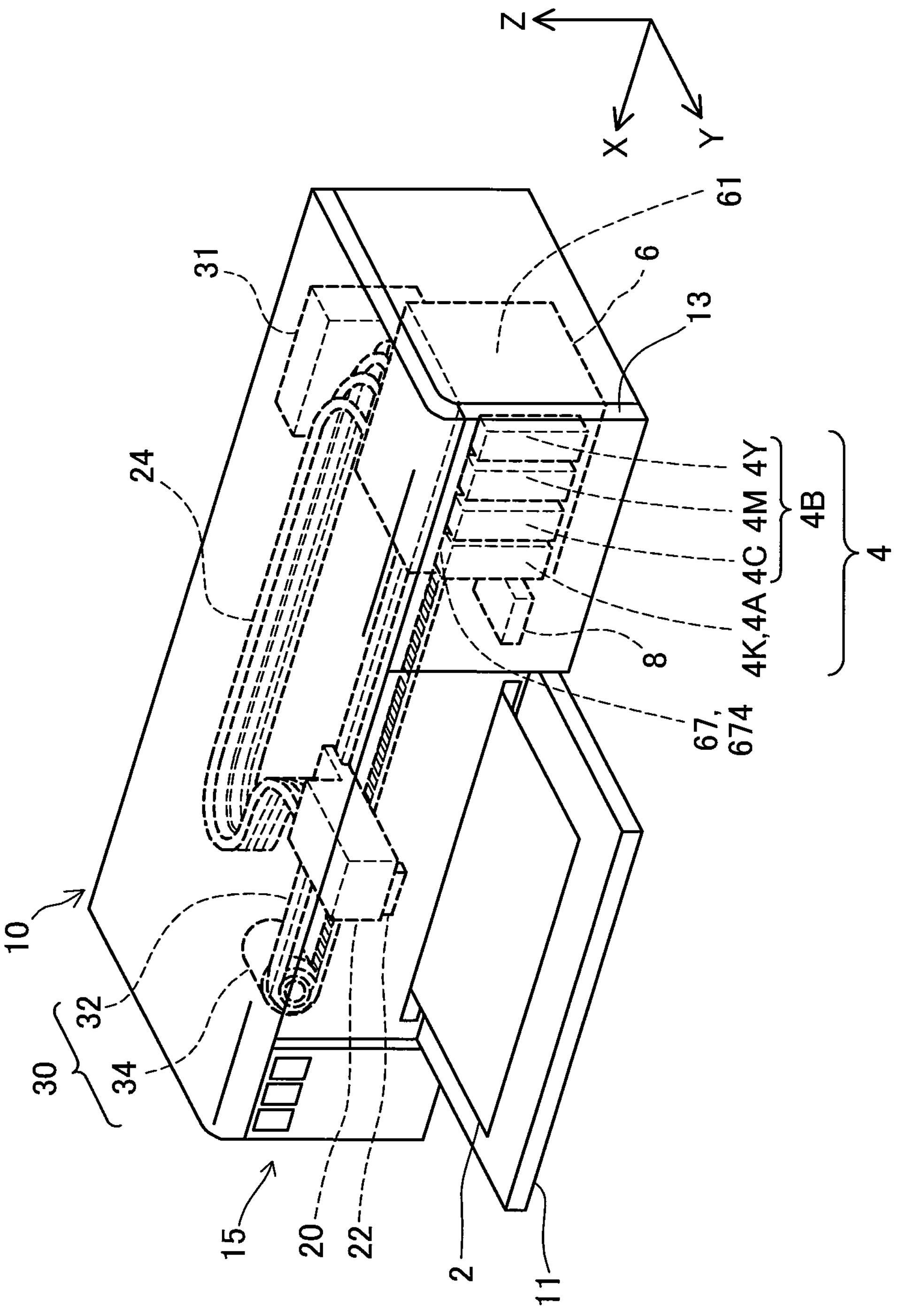
FIG. 1 is a perspective view illustrating a configuration of a printing system according to an embodiment of the present disclosure.

FIG. 1 is a perspective view illustrating a configuration of a printing system 1 according to an embodiment of the present disclosure. FIG. 1 illustrates XYZ axes which are three spatial axes orthogonal to each other. Directions in which arrows of the X-axis, the Y-axis, and the Z-axis are directed indicate positive directions along the X-axis, the Y-axis, and the Z-axis, respectively. The positive directions along the X-axis, the Y-axis, and the Z-axis are a +X direction, a +Y direction, and a +Z direction, respectively. Directions opposite to the directions in which the arrows of the X-axis, the Y-axis, and the Z-axis are directed indicate negative directions along the X-axis, the Y-axis, and the Z-axis, respectively. The negative directions along the X-axis, the Y-axis, and the Z-axis are a −X direction, a −Y direction, and a −Z direction, respectively. When positiveness and negativeness in directions along the X-axis, the Y-axis, and the Z-axis do not matter, the directions may be referred to as an X direction, a Y direction, and a Z direction, respectively. The same applies to the drawings and description made below.

The printing system 1 includes a printing device 10 and a cartridge 4 that supplies ink, which is liquid, to the printing device 10.

The printing device 10 according to the present embodiment is an ink jet printer that jets ink as a liquid from a jetting head 22. The printing device 10 is a large printer that performs printing on large-format paper (A2 to A0 or the like) such as a poster. The printing device 10 includes a cartridge mounting section 6, a controller 31, a carriage 20, the jetting head 22, and a driving mechanism 30. Further, the printing device 10 includes a manipulation button 15 for a user to manipulate an operation of the printing device 10.

The cartridge mounting section 6 has a first device wall 67 positioned on a +Y direction side. The first device wall 67 has an insertion and removal opening section 674 which is an entrance/exit of the cartridge 4 to/from the accommodating chamber 61. Via the insertion and removal opening section 674, the cartridge 4 is accommodated in the accommodating chamber 61 of the cartridge mounting section 6, or the cartridge 4 is removed from the accommodating chamber 61. A plurality of cartridges 4 are detachably mounted on the cartridge mounting section 6, respectively. In the present embodiment, one cartridge for each of four types of cartridges 4 is mounted corresponding to four colors (black, yellow, magenta, and cyan) of ink, that is, a total of four cartridges 4 are mounted on the cartridge mounting section 6. The cartridge 4 accommodating black ink is also referred to as a cartridge 4K, the cartridge 4 accommodating yellow ink is also referred to as a cartridge 4Y, and the cartridge 4 accommodating magenta ink is also referred to as a cartridge 4M, and the cartridge 4 accommodating cyan ink is also referred to as a cartridge 4C. In the present embodiment, the cartridge 4K is configured to be able to accommodate a larger amount of liquid than the cartridges 4C, 4M, and 4Y. Accordingly, the cartridge 4K is also referred to as a first type cartridge 4A, and the cartridges 4C, 4M, and 4Y are also referred to as a second type cartridge 4B.

The printing device 10 has a replacement cover 13 on a front surface on a +Y direction side. When a +Z direction side of the replacement cover 13 is tilted toward a near side that is the +Y direction side, an opening of the cartridge mounting section 6 appears, and the cartridge 4 can be attached and detached. When the cartridge 4 is mounted on the cartridge mounting section 6, the ink can be supplied to the jetting head 22 provided on the carriage 20 via a tube 24 as a liquid flow tube. In the present embodiment, the ink is supplied from the cartridge 4 to the jetting head 22 by using a hydraulic head difference. Specifically, the ink is supplied to the jetting head 22 by a hydraulic head difference between a liquid surface of the ink in the cartridge 4 and the jetting head 22. In another embodiment, the ink may be supplied to the jetting head 22 by sucking the ink in the cartridge 4 by a pump mechanism (not shown) of the printing device 10. The tube 24 is provided for each type of ink. Here, a state where the cartridge 4 is mounted on the cartridge mounting section 6 and the ink as a liquid can be supplied to the printing device 10 is also referred to as a "mounted state".

The jetting head 22 is provided with a nozzle for each type of ink. The jetting head 22 jets ink from nozzles toward a printing paper 2 to print data such as a character or an image. In the present embodiment, the printing device 10 is a so-called "off-carriage type" printer in which the cartridge mounting section 6 does not interlock with movement of the carriage 20. The technique according to the present disclosure is also applicable to a so-called "on-carriage type" printer in which the cartridge mounting section 6 is provided on the carriage 20 and the cartridge mounting section 6 moves together with the carriage 20.

The controller 31 controls each section of the printing device 10 and exchanges a signal with the cartridge 4. The carriage 20 moves the jetting head 22 relative to the printing paper 2.

The driving mechanism 30 cause the carriage 20 to reciprocate based on a control signal from the controller 31. The driving mechanism 30 includes a timing belt 32 and a driving motor 34. By transmitting power of the driving motor 34 to the carriage 20 via the timing belt 32, the carriage 20 reciprocates in a main scanning direction, which is along the X direction. Further, the printing device 10 includes a transporting mechanism for moving the printing paper 2 in a sub-scanning direction, which is the +Y direction. When printing is performed, the printing paper 2 is moved in the sub-scanning direction by the transporting mechanism, and the printing paper 2 is output onto a front cover 11 after the printing is completed.

In addition, a region called a home position is provided at a position outside a printing region where the carriage 20 is moved in the main scanning direction, and a maintenance mechanism for performing maintenance for normally performing printing is installed in the home position. The maintenance mechanism is composed of a cap member 8 that forms a closed space so as to surround the nozzle by being pressed against a surface on which the nozzle is formed at a bottom surface side of the jetting head 22, an elevation mechanism (not shown) that elevates the cap member 8 in order to press the cap member 8 against the nozzle surface of the jetting head 22, a suction pump (not shown) that introduces a negative pressure into the closed space formed by pressing the cap member 8 against the nozzle surface of the jetting head 22.

In the present embodiment, in a use state of the printing system 1, an axis along the sub-scanning direction for transporting the printing paper 2 is the Y-axis, an axis along the gravity direction is set as the Z-axis, and an axis along a movement direction of the carriage 20 is the X-axis. Here, the "use state of the printing system 1" refers to a state where the printing system 1 is installed in a horizontal surface. In addition, in the present embodiment, the sub-scanning direction is the +Y direction, the direction opposite thereto is the −Y direction, the gravity direction is the −Z direction, and the antigravity direction is the +Z direction. The X direction and the Y direction are directions along a horizontal direction. When the printing system 1 is viewed from a front surface side, a direction from a right side to a left side is the +X direction, and the direction opposite thereto is the −X direction. Further, in the present embodiment, an insertion direction in which the cartridge 4 is inserted into the cartridge mounting section 6 for mounting is the −Y direction, and a direction in which the cartridge 4 is removed from the cartridge mounting section 6 is the +Y direction. Accordingly, in the cartridge mounting section 6, a −Y direction side is also referred to as a far side, and the +Y direction side is also referred to as the near side. In addition, in the present embodiment, an arrangement direction of the plurality of cartridges 4 is the X direction.

A-2. Description of Mounting Process and Mounted State of Cartridge

Figure 2:
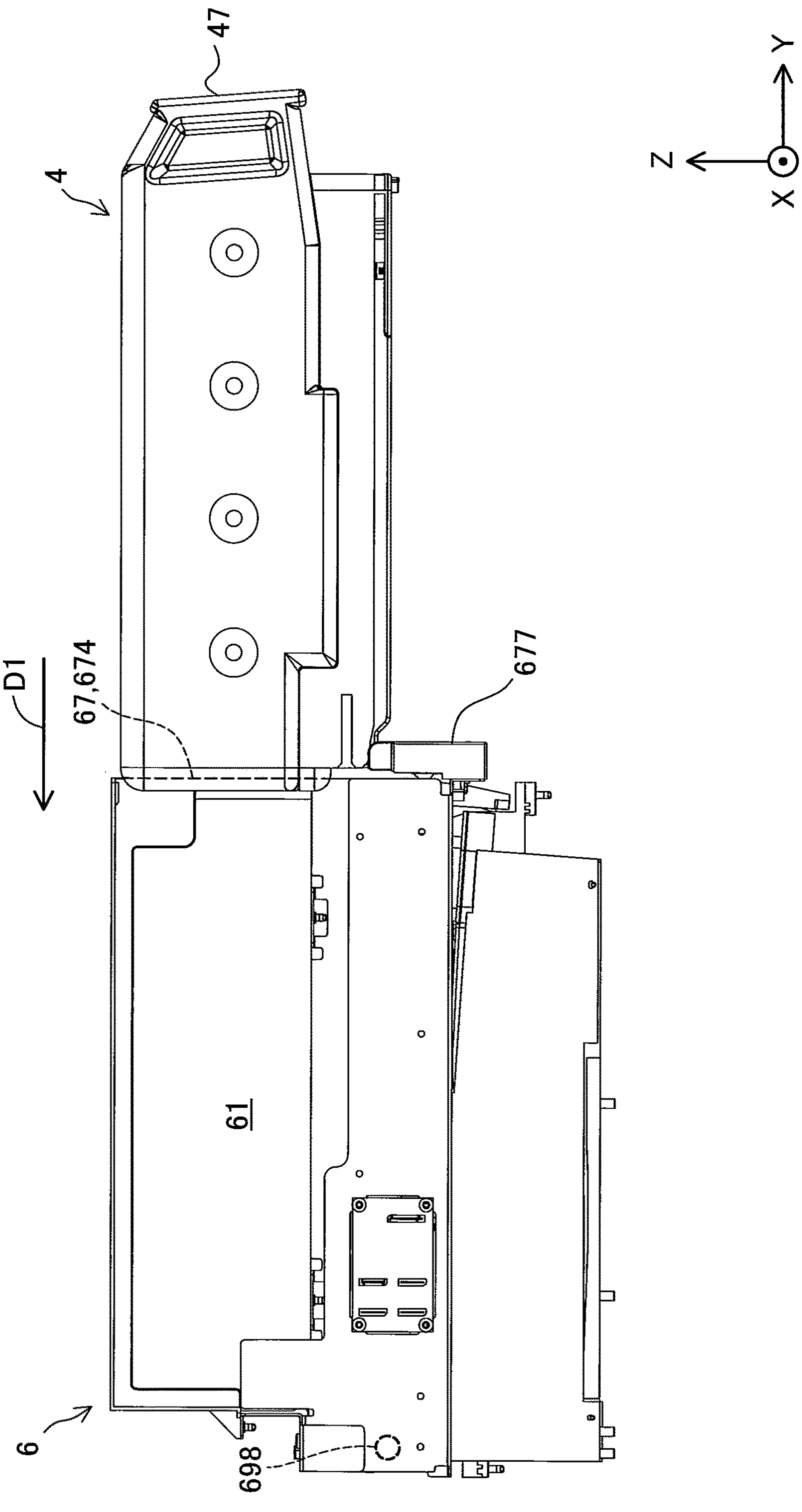
FIG. 2 is a first view describing a mounting process of a cartridge on a cartridge mounting section.
Figure 3:
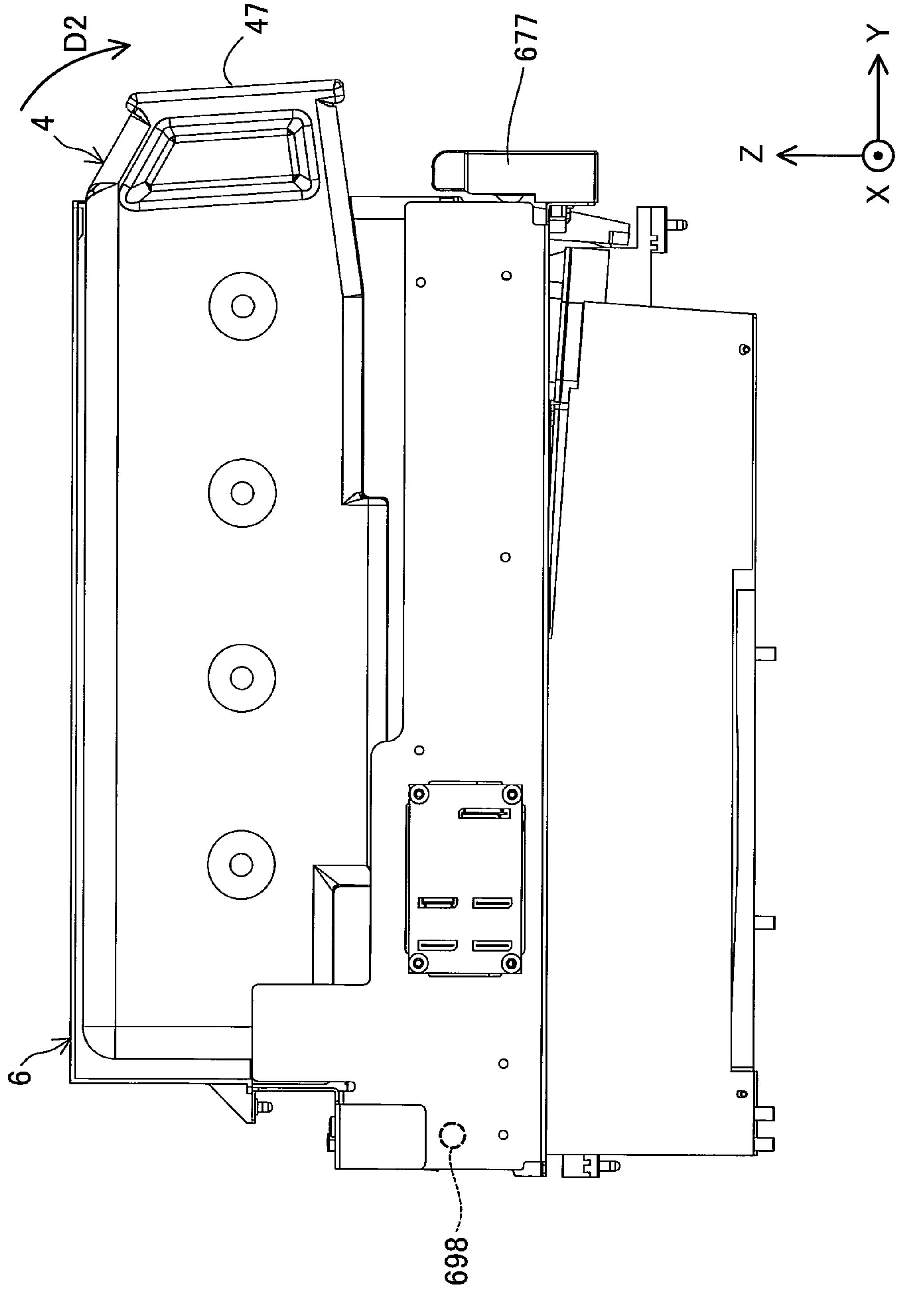
FIG. 3 is a second view describing the mounting process.
Figure 4:
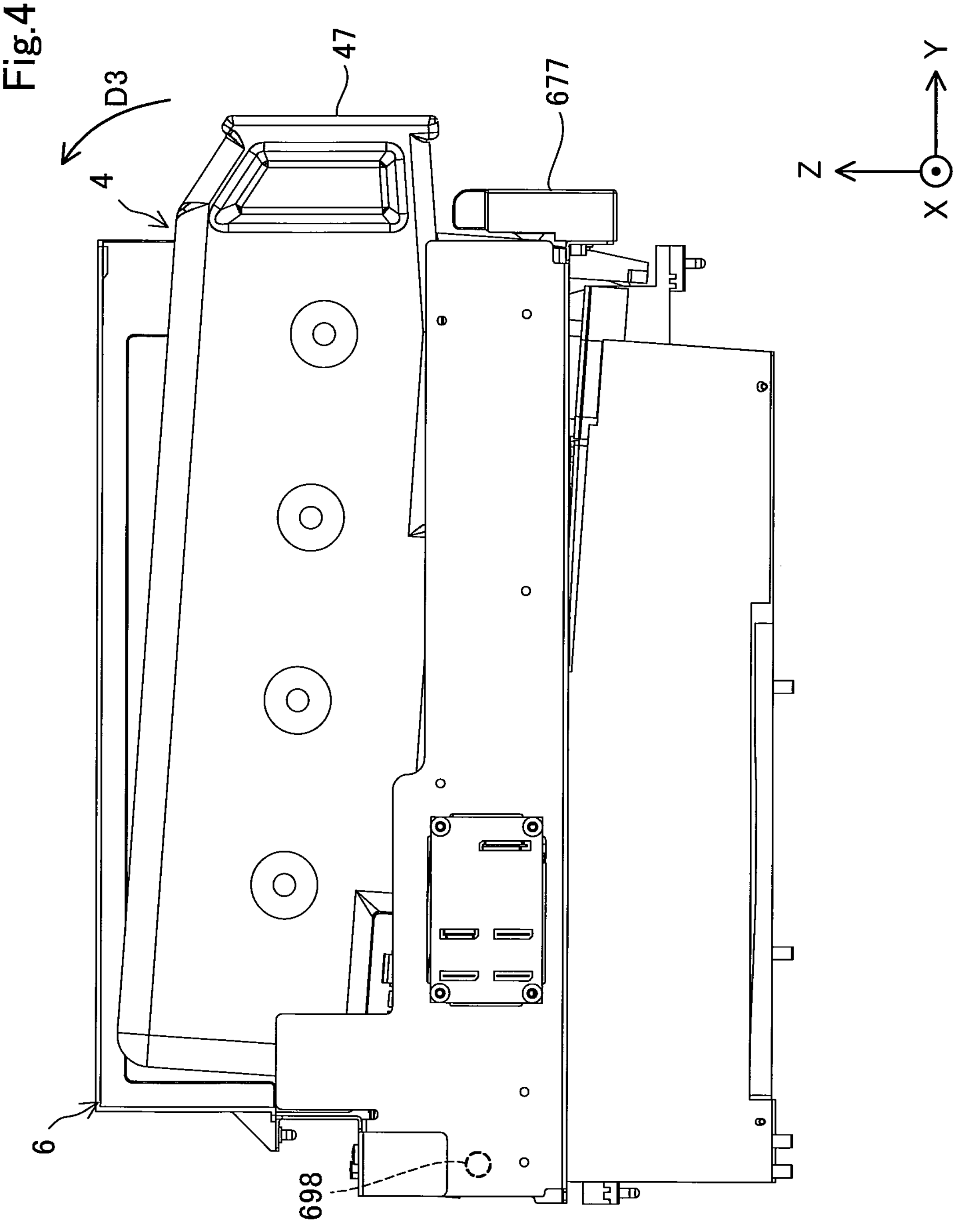
FIG. 4 is a view illustrating a mounted state where mounting of the cartridge on the cartridge mounting section is completed.

FIG. 2 is a first view describing a mounting process of the cartridge 4 on the cartridge mounting section 6. FIG. 3 is a second view describing the mounting process. FIG. 4 is a view illustrating a mounted state where mounting of the cartridge 4 on the cartridge mounting section 6 is completed.

The mounting process is composed of a terminal connecting process and a supply section coupling process executed next to the terminal connecting process. The terminal connecting process is a process in which, as illustrated in FIG. 2, a device-side terminal of the cartridge mounting section 6 that will be described later and a cartridge-side terminal of the cartridge 4 that will be described later are brought into contact with each other and electrically connected to each other, by moving the cartridge 4 in an insertion direction D1, which is the −Y direction, and by inserting the cartridge 4 into the accommodating chamber 61 of the cartridge mounting section 6, via the insertion and removal opening section 674 of the first device wall 67. The insertion direction D1 is parallel to the horizontal direction. As illustrated in FIGS. 3 and 4, the supply section coupling process is a process in which, in a state where electrical connection between the device-side terminal and the cartridge-side terminal is maintained, a liquid introduction section of the cartridge mounting section 6 that will be described later and a liquid supply section of the cartridge 4 that will be described later are coupled to each other. Specifically, in the supply section coupling process, the liquid introduction section and the liquid supply section are coupled to each other by rotationally moving a rear wall 47 side of the cartridge 4 in a coupling direction D2 indicated by an arrow around a rotation fulcrum 698 of the cartridge mounting section 6. In the mounted state illustrated in FIG. 4, the cartridge 4 is held in the mounted state by being engaged by an engagement forming body 677 provided on a first device wall 67 side of the cartridge mounting section 6.

As illustrated in FIG. 4, when taking out the cartridge 4 from the cartridge mounting section 6, the user rotationally moves the rear wall 47 side of the cartridge 4 in a decoupling direction D3, which is a direction opposite to the coupling direction D2, with the rotation fulcrum 698 as a fulcrum by lifting the rear wall 47 side. During this rotational movement, the engagement by the engagement forming body 677 is released. After rotationally moving the cartridge 4 in the decoupling direction D3 to put the cartridge 4 into a state illustrated in FIG. 3, the cartridge 4 is taken out from the cartridge mounting section 6 by moving the cartridge 4 in the +Y direction, which is a removing direction.

A-3. Detailed Description of Mounted State of Cartridge

Figure 5:
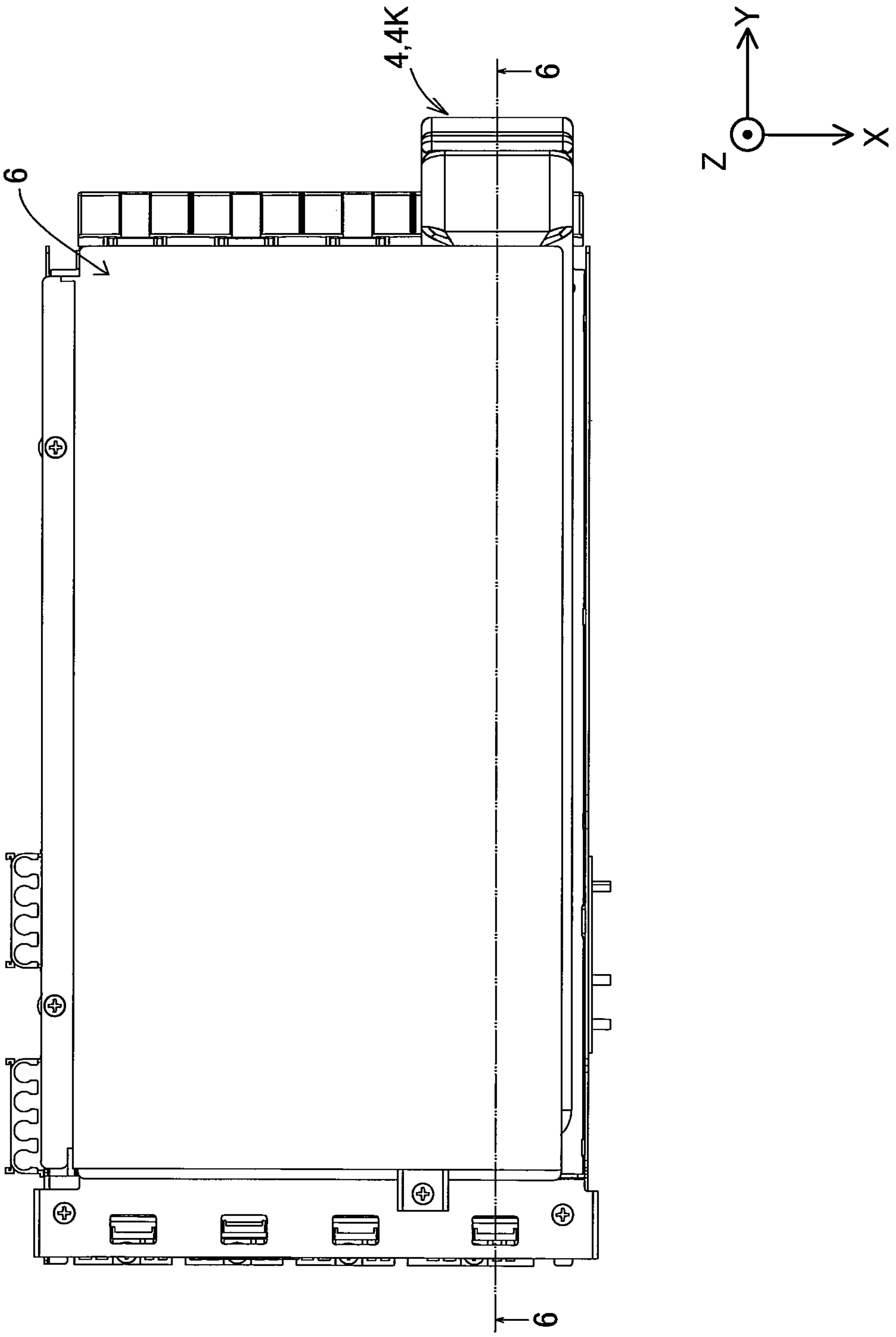
FIG. 5 is a view of the cartridge mounting section viewed from a +Z direction side.
Figure 6:
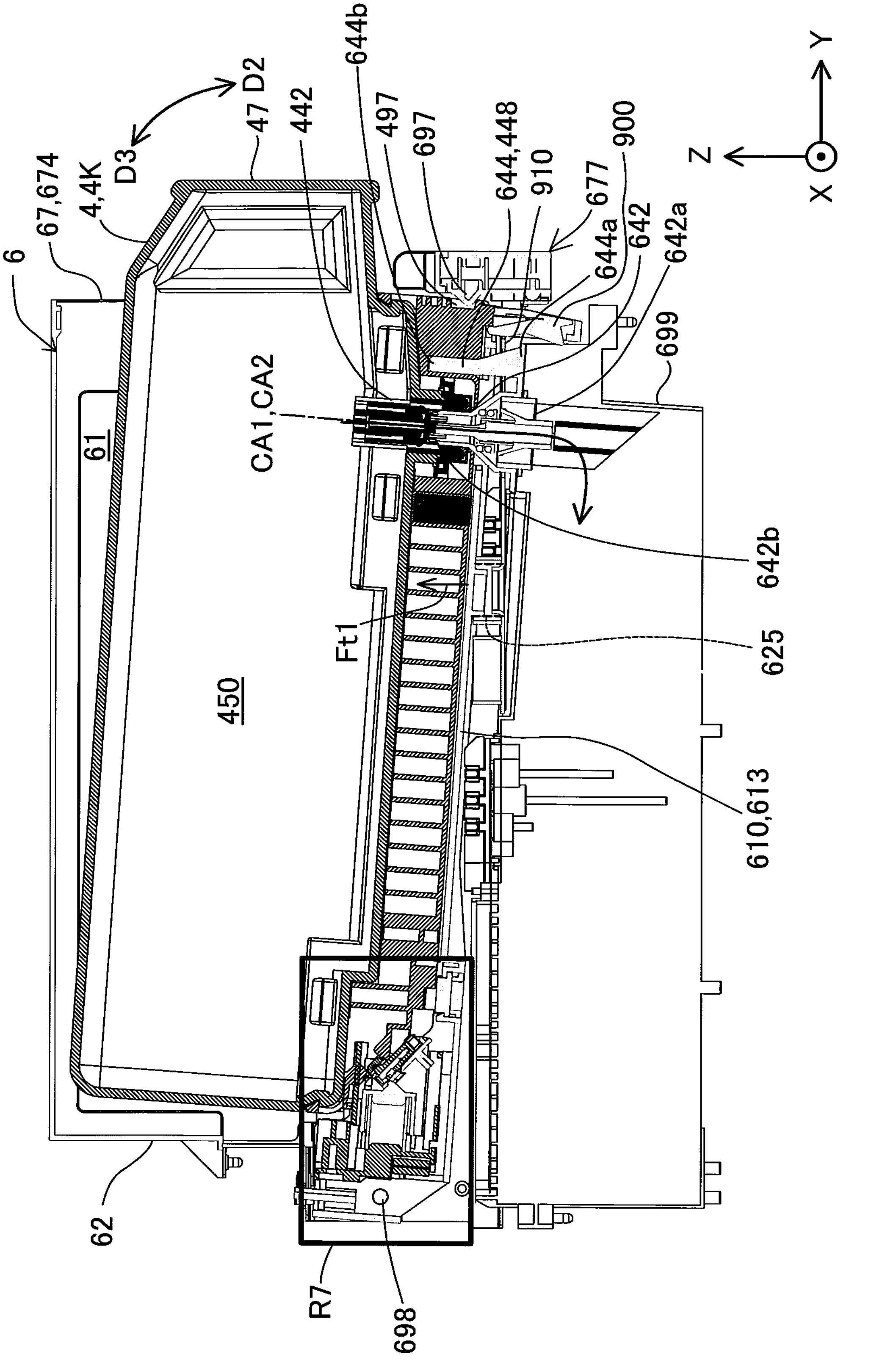
FIG. 6 is a VI-VI cross-sectional view of FIG. 5.
Figure 7:
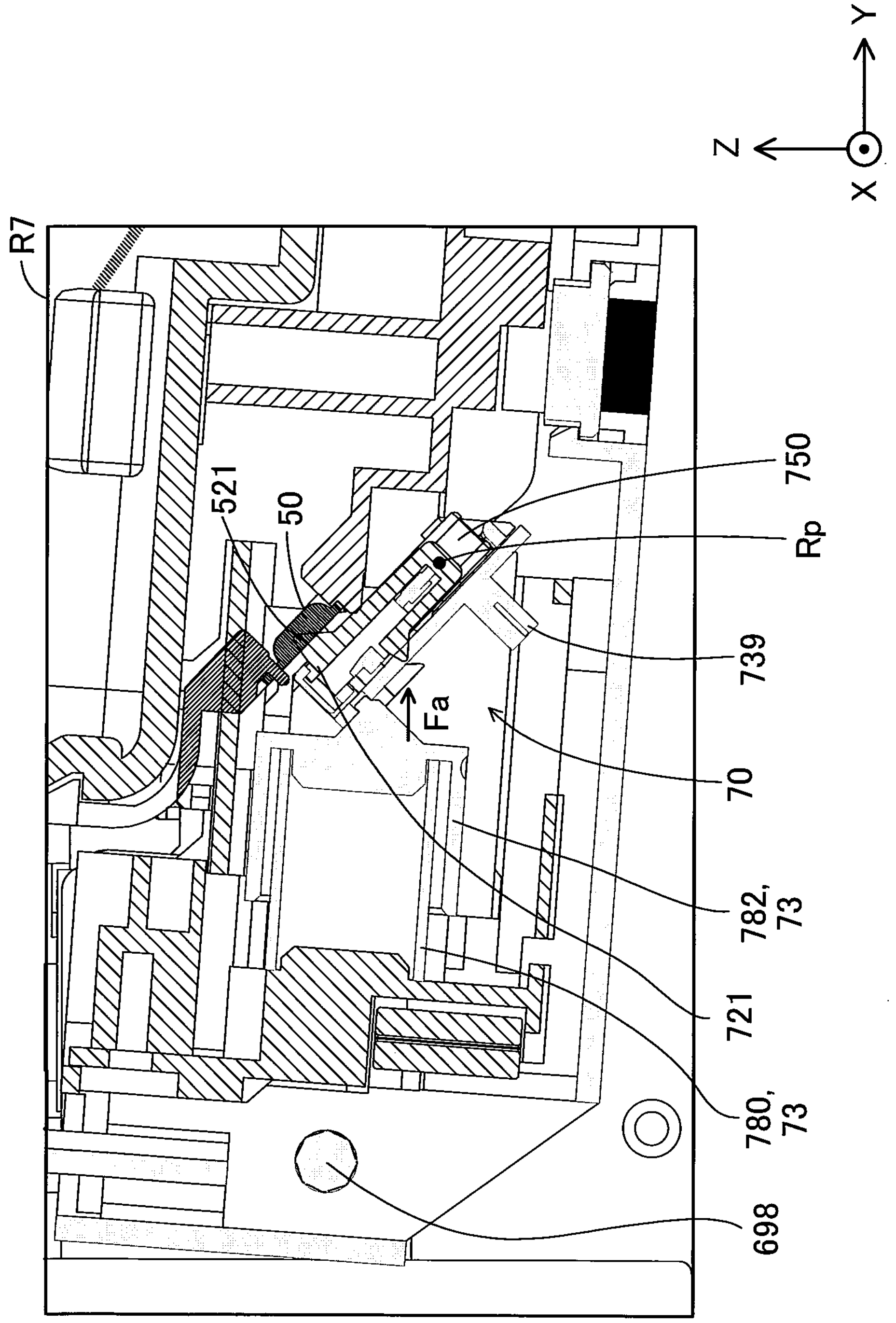
FIG. 7 is an enlarged view of a region R7 in FIG. 6.

FIG. 5 is a view of the cartridge mounting section 6 viewed from a +Z direction side. FIG. 6 is a VI-VI cross-sectional view of FIG. 5. FIG. 7 is an enlarged view of a region R7 in FIG. 6. In FIG. 5, the cartridge 4K is mounted on the cartridge mounting section 6. The mounted state of the cartridge 4 will be described with reference to FIGS. 5 to 7. The mounted state is the same for the cartridges 4C, 4M, 4Y, and 4K.

As illustrated in FIG. 6, the cartridge mounting section 6 has a support member 610 that forms an accommodating chamber bottom wall of the accommodating chamber 61. The support member 610 supports the cartridge 4 from a lower side. In a state where the cartridge 4 is inserted into the accommodating chamber 61 of the cartridge mounting section 6, the cartridge 4 is supported from a −Z direction side by the support member 610. In addition, in the mounted state where the cartridge 4 is mounted on the accommodating chamber 61 of the cartridge mounting section 6, a liquid supply section 442 of the cartridge 4 and a liquid introduction section 642 of the cartridge mounting section 6 are coupled to each other. Accordingly, a liquid accommodated in a liquid accommodating section 450 of the cartridge 4 is supplied to the liquid introduction section 642 via the liquid supply section 442. In the present embodiment, while a liquid is supplied from the liquid supply section 442 to the liquid introduction section 642, air accommodated in a liquid storage section 699 of the cartridge mounting section 6 becomes an air bubble, and the air bubble flows through the liquid introduction section 642, the liquid supply section 442, and the liquid accommodating section 450. As a result, an air-liquid exchange of the liquid accommodating section 450 is performed. In another embodiment, the cartridge 4 may have an atmospheric communication passage through which the liquid accommodating section 450 and an outside communicate with each other, and the air-liquid exchange may be performed via the atmospheric communication passage. The atmospheric communication passage is disposed at a position different from the liquid supply section 442, and is formed at a wall forming the liquid accommodating section 450, for example.

The liquid introduction section 642 receives a liquid supplied from the cartridge 4. The liquid introduction section 642 is a tubular member, and has an internal flow path through which a liquid flows inside. The liquid introduction section 642 has a base end 642*a* and a tip end 642*b*. The tip end 642*b* is formed with an opening that communicates with an introduction section flow path that is an internal flow path, and the ink of the liquid supply section 442 flows into the introduction section flow path through the opening. The base end 642*a* is coupled to the liquid storage section 699, and causes the ink that have flown through the introduction section flow path to flow into the liquid storage section 699. The liquid storage section 699 is positioned on the −Z direction side of the accommodating chamber 61. The liquid storage section 699 communicates with the jetting head 22 via the tube 24 illustrated in FIG. 1. As described above, the liquid introduction section 642 communicates with the jetting head 22 via the liquid storage section 699 and the tube 24. A central axis CA1 of the liquid introduction section 642 is parallel to a central axis CA2 of the liquid supply section 442 in the mounted state and is inclined with respect to the Z direction. In other words, a direction along the central axis CA1, which is a direction in which the liquid introduction section 642 extends, intersects the insertion direction of the cartridge 4. The central axis CA2 of the liquid supply section 442 is a direction along a direction in which the liquid supply section 442 extends.

As illustrated in FIG. 7, in the mounted state of the cartridge 4, a circuit substrate 50 of the cartridge 4 and a device-side terminal section 70 of the cartridge mounting section 6 are electrically connected by coming into contact with each other. The device-side terminal section 70 is held by a holding mechanism 73. The device-side terminal section 70 has a plurality of device-side terminals 721, a terminal holder 750, and a connector 739.

As for the plurality of device-side terminals 721, nine device-side terminals 721 are provided in the present embodiment. Each of the plurality of device-side terminals 721 is a metal plate member having conductivity. The device-side terminal 721 has a terminal rotation fulcrum Rp, and a part of the circuit substrate 50, which is an end portion that comes into contact with a cartridge-side terminal 521, can be elastically deformed with the terminal rotation fulcrum Rp as a fulcrum. Directions in which the portion is elastically deformed are directions along the Y direction and the Z direction. The terminal holder 750 holds the plurality of device-side terminals 721. The connector 739 is electrically connected to a plurality of device-side terminals 721. Further, the connector 739 is electrically connected to the controller 31 of the printing device 10 by wiring (not shown). As a result, the circuit substrate 50 and the controller 31 can perform data communication.

The holding mechanism 73 has a biasing member 780 and an installation member 782. The biasing member 780 is composed of a coil spring. The biasing member 780 is disposed inside the installation member 782. The device-side terminal section 70 is installed in the installation member 782. The biasing member 780 is compressed in a state where the insertion of the cartridge 4 into the cartridge mounting section 6 is completed. Accordingly, the biasing member 780 applies an external force Fa in a direction facing the device-side terminal section 70 on a removing direction side of the cartridge 4, which is the first device wall 67 side, via the installation member 782. Since the device-side terminal section 70 is pressed against the circuit substrate 50 by the external force Fa, the contact between the device-side terminal 721 and the cartridge-side terminal 521 is appropriately maintained.

As described above, the holding mechanism 73 displaceably holds the device-side terminal section 70 in a direction along the insertion direction of the cartridge 4. Further, one end portion of the biasing member 780 on a device-side terminal section 70 side is configured to be movable minutely in the X direction and the Z direction intersecting the insertion direction. As a result, the device-side terminal section 70 is held by the holding mechanism 73 so as to be minutely movable in the X direction and the Z direction intersecting the insertion direction.

As illustrated in FIG. 6, in the supply section coupling process, a device-side supply section positioning section 644 that is a projection included in the cartridge mounting section 6 enters a supply section positioning section 448 with a recessed shape included in the cartridge 4, so that movement of the liquid supply section 442 intersecting the central axis CA2 of the liquid supply section 442 is restricted. Accordingly, the positioning of the liquid supply section 442 with respect to the liquid introduction section 642 is performed. The device-side supply section positioning section 644 has a substantially rectangular parallelepiped shape. The device-side supply section positioning section 644 has one end portion 644*a* and the other end portion 644*b*. The one end portion 644*a* is positioned on a liquid storage section 699 side. The one end portion 644*a* is positioned on an accommodating chamber 61 side with respect to the other end portion 644*b*.

In the mounted state of the cartridge 4, a main wall 613 forming a bottom portion of the support member 610 is inclined with respect to the Y direction. Specifically, the main wall 613 of the support member 610 is inclined so as to be positioned on the −Z direction side, which is the lower side, as going in the +Y-axis direction. The main wall 613 is parallel to the Y direction in an initial disposition state of the cartridge mounting section 6 in which the cartridge 4 is not mounted.

The cartridge mounting section 6 has a biasing member 625 that applies an external force Ft1 to the support member 610 in order to return the support member 610 to a position of the initial disposition state, in the mounted state of the cartridge 4. The biasing member 625 is a coil spring provided between the support member 610 and the liquid storage section 699, and is in a compressed state in the mounted state. The external force Ft1 having a +Z direction component is applied to the support member 610 by the compressed state. Meanwhile, in the mounted state of the cartridge 4, the mounted state is maintained by engaging a cartridge engaging portion 497 of the cartridge 4 with a mounting engaging portion 697 of the cartridge mounting section 6. The mounting engaging portion 697 is formed at the engagement forming body 677 positioned on the first device wall 67 side of the cartridge mounting section 6.

As described above, as illustrated in FIG. 6, the support member 610 is pressed down in the coupling direction D2 around the rotation fulcrum 698, so that the liquid supply section 442 is pressed down and coupled to the liquid introduction section 642. Further, the support member 610 is pressed up in the decoupling direction D3 around the rotation fulcrum 698, so that the liquid supply section 442 is pressed up and separated from the liquid introduction section 642, so that the liquid supply section 442 and the liquid introduction section 642 are decoupled.

A-4. Detailed Configuration of Cartridge 4

Figure 8:
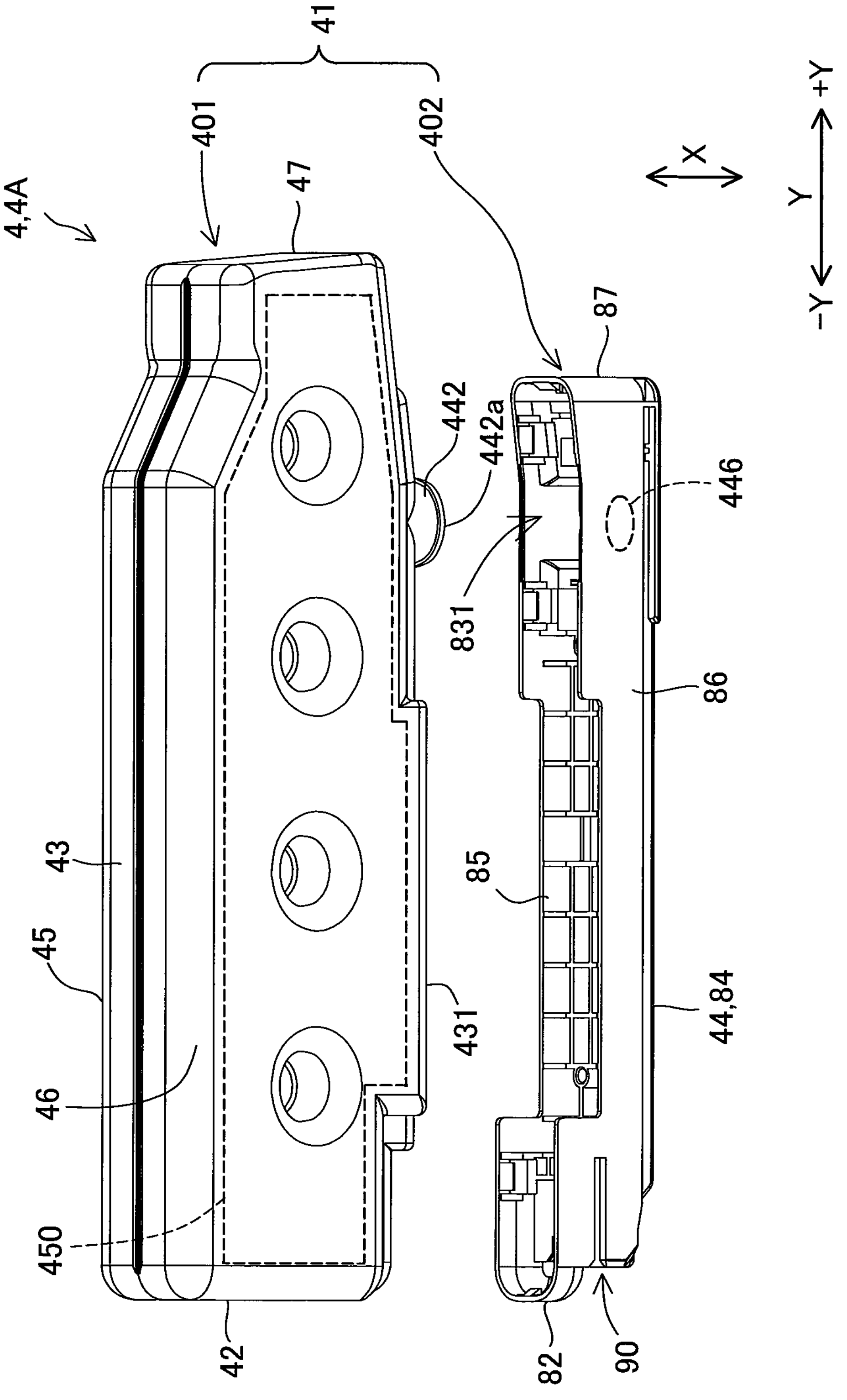
FIG. 8 is an exploded perspective view of a first type cartridge.
Figure 9:
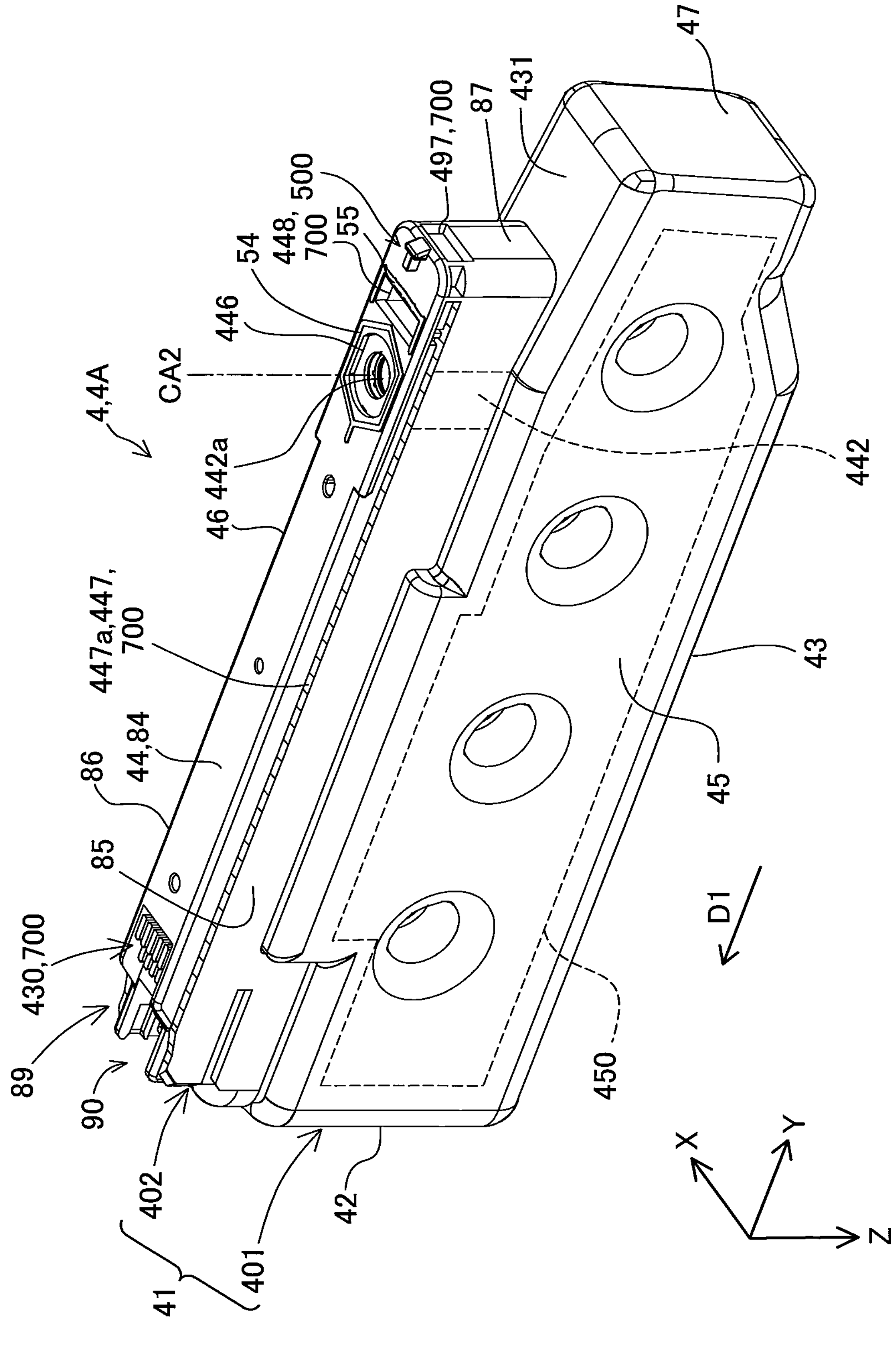
FIG. 9 is a perspective view of the first type cartridge.

FIG. 8 is an exploded perspective view of the first type cartridge 4A. FIG. 9 is a perspective view of the first type cartridge 4A. A difference between the first type cartridge 4A and the second type cartridge 4B illustrated in FIG. 1 is a volume of the liquid accommodating section 450. Specifically, a width of a liquid accommodating body 401 of the first type cartridge 4A that will be described later is larger than a width of a liquid accommodating body 401 of the second type cartridge 4B, so that the volume of the liquid accommodating section 450 differs. Since other configurations such as an adapter 402 as a disposition portion are the same for the first type cartridge 4A and the second type cartridge 4B, hereinafter, the detailed configuration of the cartridge 4 will be described using the first type cartridge 4A. Hereinafter, the first type cartridge 4A is also simply referred to as the cartridge 4. In the drawings illustrating the cartridge 4, the X direction, the Y direction, and the Z direction are based on a completed state of the terminal connecting process shown in FIG. 3, which is a state where the insertion of the cartridge 4 into the cartridge mounting section 6 is completed. In other words, in the drawings illustrating the cartridge 4, the X direction, the Y direction, and the Z direction are based on the state before the supply section coupling process in which the support member 610 is rotationally moved.

As illustrated in FIG. 9, the outer shape of the cartridge 4 is a substantially rectangular parallelepiped shape. In the cartridge 4, a direction along the −Y direction, which is the insertion direction into the cartridge mounting section 6, is a longitudinal direction, the X direction is a lateral direction as a width direction, and the Z direction is a height direction. In the cartridge 4, a dimension in the longitudinal direction is the largest and a dimension in the lateral direction is the smallest.

The cartridge 4 includes a cartridge main body 41 and the circuit substrate 50 illustrated in FIG. 7 installed in the cartridge main body 41. In the present embodiment, the cartridge main body 41 is composed of two members as illustrated in FIG. 8. Specifically, the cartridge main body 41 includes the liquid accommodating body 401 and the adapter 402 as a disposition portion installed in the liquid accommodating body 401 by fitting. In another embodiment, the cartridge main body 41 may be integrated.

Each of the liquid accommodating body 401 and the adapter 402 is molded by, for example, performing injection molding of synthetic resin such as polypropylene. The liquid accommodating body 401 and the adapter 402 may be formed of the same material or may be formed of different materials.

As illustrated in FIG. 9, the cartridge main body 41 includes a front wall 42, the rear wall 47, an upper wall 43, a bottom wall 44, a first side wall 45 as a side wall, a second side wall 46 as a side wall, and the corner portion 89. The walls 42, 43, 44, 45, 46, and 47 are also referred to as surfaces 42, 43, 44, 45, 46, and 47. The front wall 42 and the rear wall 47 face each other in the Y direction along the insertion direction. The upper wall 43 and the bottom wall 44 face each other in the Z direction. The Z direction is parallel to the central axis CA2 along the extending direction of the liquid supply section 442. The first side wall 45 and the second side wall 46 face each other in the X direction.

The front wall 42 is positioned on an insertion direction D1 side in which the cartridge 4 is inserted into the mounting section 6. That is, the front wall 42 forms an insertion tip end surface of the −Y direction side, which is the insertion direction D1 side. The rear wall 47 forms a surface of the +Y direction side, which is in the removing direction. The upper wall 43 is positioned on the +Z direction side and intersects the front wall 42 and the rear wall 47. The bottom wall 44 is positioned on the −Z direction side, which is a gravity direction side, in the mounted state, and forms a coupling tip end surface in the coupling direction D2 illustrated in FIG. 3. That is, the bottom wall 44 is positioned on a coupling direction D2 side. The bottom wall 44 intersects the front wall 42 and the rear wall 47. The bottom wall 44 is formed with an opening section 446 through which the liquid introduction section 642 is inserted. When the cartridge 4 is viewed from a bottom wall 44 side, the opening section 446 and the liquid supply section 442 have an overlapping positional relationship. In the present embodiment, the liquid supply section 442 is disposed such that the central axis CA2 of the liquid supply section 442 passes through the opening section 446. As illustrated in FIG. 9, the bottom wall 44 faces a supply section tip end portion 442*a* of the liquid supply section 442 in the Z direction.

The first side wall 45 is positioned on the −X direction side, and the second side wall 46 is positioned on the +X direction side. Each of the first side wall 45 and the second side wall 46 intersects the front wall 42, the rear wall 47, the upper wall 43, and the bottom wall 44. Each of the first side wall 45 and the second side wall 46 extends along the insertion direction D1. The corner portion 89 is provided at a corner part where the front wall 42 and the bottom wall 44 intersect each other. The corner portion 89 has a terminal disposition portion 90 with a recessed shape recessed inward. The circuit substrate 50 illustrated in FIG. 7 is installed in the terminal disposition portion 90.

As illustrated in FIG. 8, the liquid accommodating body 401 has a liquid accommodating section 450 that accommodates a liquid, and the liquid supply section 442. The liquid supply section 442 is a tubular member protruding from an accommodating body bottom wall 431 of the liquid accommodating body 401 facing the upper wall 43. The liquid supply section 442 is coupled to the liquid introduction section 642 in the mounted state, and supplies a liquid in the liquid accommodating section 450 to the jetting head 22 of the printing device 10 via the liquid introduction section 642. As illustrated in FIG. 9, the liquid supply section 442 has a supply section tip end portion 442*a* as a tip end portion that forms an opening through which the liquid flows out to the outside.

As illustrated in FIG. 8, the adapter 402 as the disposition portion includes an adapter front wall 82 as a disposition portion front wall, an adapter rear wall 87 as a disposition portion rear wall, and an adapter bottom wall 84 as a disposition portion bottom wall, a first adapter side wall 85 as a first disposition portion side wall, and a second adapter side wall 86 as a second disposition portion side wall. The adapter front wall 82 forms a part of the front wall 42 and forms an insertion tip end surface at the −Y direction side, which is the insertion direction. The adapter rear wall 87 forms a part of the rear wall 47 and faces the adapter front wall 82 in the Y direction. The adapter bottom wall 84 forms the bottom wall 44. The adapter bottom wall 84 intersects the adapter front wall 82 and the adapter rear wall 87.

The first adapter side wall 85 intersects the adapter bottom wall 84 and extends in the Y direction, which is the longitudinal direction of the adapter 402. The first adapter side wall 85 is a plate-shaped wall that rises from the adapter bottom wall 84 toward the liquid accommodating body 401. The second adapter side wall 86 faces the first adapter side wall 85 in the X direction, which is the lateral direction of the adapter 402. The second adapter side wall 86 intersects the adapter bottom wall 84 and extends in the Y direction, which is the longitudinal direction of the adapter 402. The second adapter side wall 86 is a plate-shaped wall that rises from the adapter bottom wall 84 toward the liquid accommodating body 401.

The adapter 402 has a recessed shape having the adapter bottom wall 84 as a bottom. The adapter 402 has an opening on the side facing the adapter bottom wall 84, and the liquid supply section 442 is disposed inside the adapter 402 via the opening. A part of the adapter 402 in which the liquid supply section 442 is disposed is also referred to as a supply section disposition portion 831. As illustrated in FIG. 9, the adapter bottom wall 84 has the opening section 446 through which the liquid introduction section 642 is inserted at a position facing the supply section tip end portion 442*a*.

As illustrated in FIG. 9, the adapter 402 as the disposition portion further has a mounting element 700 that cooperates with the cartridge mounting section 6 in at least one case of the mounting process, which is the process in which the cartridge 4 is mounted on the cartridge mounting section 6 of the printing device 10, and the mounted state where the cartridge 4 is mounted on the cartridge mounting section 6. The mounting element 700 mechanically cooperates, for example, by coming into contact with or engaged with the cartridge mounting section 6, or by being inserted into the cartridge mounting section 6. The mounting element 700 has a cartridge-side identification member 430, a cartridge guide portion 447, the supply section positioning section 448, the cartridge engaging portion 497, and the circuit substrate 50 illustrated in FIG. 7.

The cartridge-side identification member 430 illustrated in FIG. 9 is provided at an end portion of the bottom wall 44 on a front wall 42 side. The cartridge-side identification member 430 is composed of projection portions. A pattern shape of the cartridge-side identification member 430 is determined by the number and a position of the projection portions. The pattern shape differs depending on the type of the cartridge 4, that is, the color of the accommodated liquid. When a correct type of cartridge 4 is inserted into the corresponding slots 61C to 61K in the mounting process of the cartridge 4, the cartridge-side identification member 430 can pass through a space of a device-side identification member 630 without colliding with the device-side identification member 630.

As illustrated in FIG. 9, the cartridge guide portion 447 extends along the insertion direction D1. In FIG. 9, for ease of understanding, the cartridge guide portion 447 is single hatched. The cartridge guide portion 447 extends from the part where the corner portion 89 is positioned in the insertion direction D1 to a part where the opening section 446 is positioned, along the insertion direction D1. That is, in the width direction of the cartridge 4, a first cartridge guide portion 447*a* is positioned on one side with respect to the opening section 446, and a second cartridge guide portion 447*b* is positioned on the other side with respect to the opening section 446. The cartridge guide portion 447 is guided in the insertion direction D1 by the device guide portion 602 of the cartridge mounting section 6. The cartridge guide portion 447 is formed at each of the first side wall 45 and the second side wall 46, specifically, at each of the first adapter side wall 85 and the second adapter side wall 86.

The cartridge guide portion 447 is formed by a step on each of the first adapter side wall 85 and the second adapter side wall 86. That is, in regard to the width of the cartridge 4, one part including the bottom wall 44 is smaller than the other part which is in a part farther from the bottom wall 44 than the one part. Accordingly, a step forming the cartridge guide portion 447 is formed. The cartridge guide portion 447 is a surface facing the −Z direction. The cartridge guide portion 447 formed at the first adapter side wall 85 is also referred to as the first cartridge guide portion 447*a*.

When the cartridge 4 is inserted into the cartridge mounting section 6, the surface on the +Z direction side of the device guide portion 602 comes into contact with the cartridge guide portion 447, so that movement of the cartridge 4 in the insertion direction D1 is guided in a state where a posture of the cartridge 4 is maintained. In a process of inserting the cartridge 4 into the accommodating chamber 61, a surface of a first device guide portion 602*a* on a +Z direction side comes into contact with the first cartridge guide portion 447*a*, and a surface of a second device guide portion 602*b* on a +Z direction side comes into contact with the second cartridge guide portion (not shown).

The supply section positioning section 448 receives the device-side supply section positioning section 644 and performs positioning of the liquid supply section 442 with respect to the liquid introduction section 642, in the mounting process. Specifically, in the supply section coupling process in the mounting process, the supply section positioning section 448 performs the positioning of the liquid supply section 442 with respect to the liquid introduction section 642 by receiving the device-side supply section positioning section 644 to restrict movement of the supply section positioning section 448 in a direction intersecting the coupling direction D2. The supply section positioning section 448 is a recess formed at the bottom wall 44 and recessed from an outer surface of the bottom wall 44. The supply section positioning section 448 is positioned between the opening section 446 and an end portion to which the adapter rear wall 87 is coupled, within the bottom wall 44. In another embodiment, the supply section positioning section 448 may be a hole penetrating the bottom wall 44.

The cartridge engaging portion 497 is provided on the rear wall 47, specifically, on the adapter rear wall 87. The cartridge engaging portion 497 is a recess recessed from an outer surface of the adapter rear wall 87. The cartridge engaging portion 497 is formed at the vicinity of an end portion of the adapter rear wall 87 intersecting the adapter bottom wall 84. As illustrated in FIG. 6, the mounting engaging portion 697 enters the cartridge engaging portion 497 in a mounted state, so that the cartridge engaging portion 497 is engaged with the mounting engaging portion 697. By the engagement, the mounted state of the cartridge 4 with respect to the cartridge mounting section 6 is maintained.

The circuit substrate 50 is disposed at the terminal disposition portion 90 illustrated in FIGS. 8 and 9 provided in the adapter 402. The circuit substrate 50 has the cartridge-side terminal 521 that comes into contact with the device-side terminal 721 illustrated in FIG. 7 in the mounted state.

As illustrated in FIG. 9, the cartridge 4 further includes a first installation portion 54 and a second installation portion 55. Each of the first installation portion 54 and the second installation portion 55 is a part in which a film (not shown) is peelably installed to the adapter bottom wall 84 by heat welding, adhesive, or the like. Each of the first installation portion 54 and the second installation portion 55 is a protrusion provided on the adapter bottom wall 84. The first installation portion 54 is formed so as to surround the opening section 446. The second installation portion 55 is formed so as to surround the supply section positioning section 448 except for an opening section 446 side. The first installation portion 54 and the second installation portion 55 are deformed or disappears when a film (not shown) is heat-welded, and a protrusion shape is lost.

Figure 10:
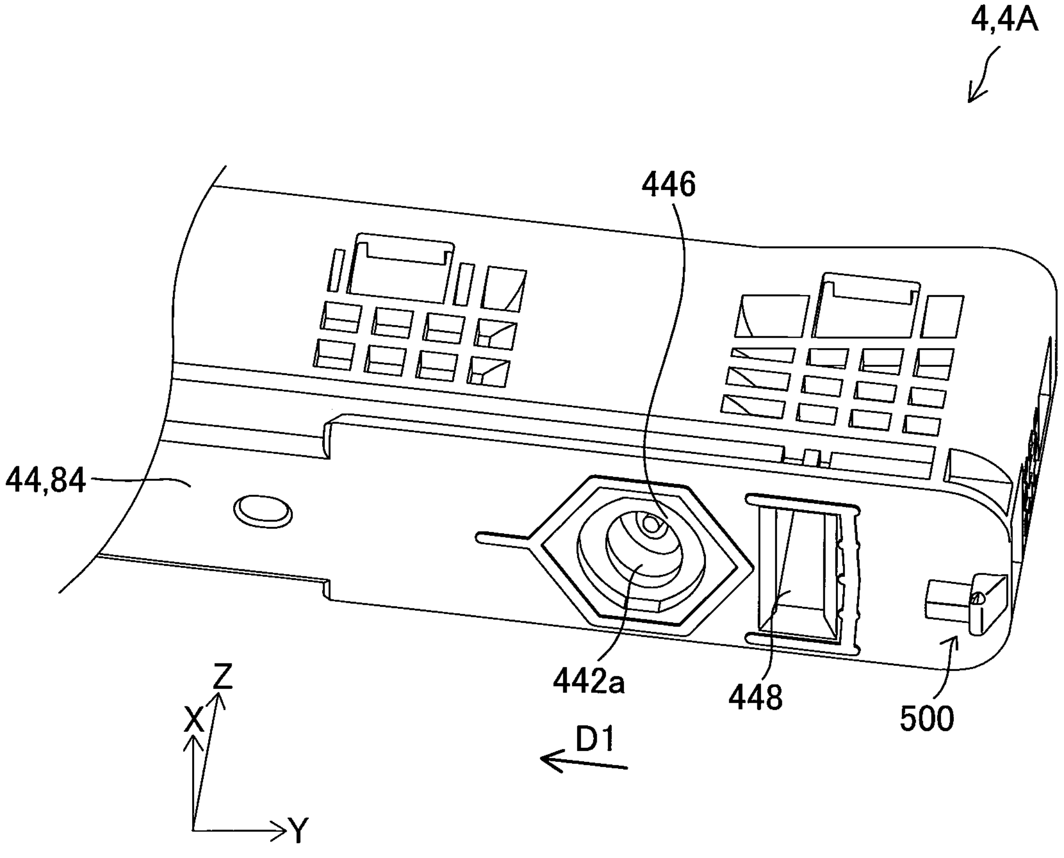
FIG. 10 is an enlarged view illustrating a part of a bottom wall in a direction opposite to an insertion direction.

FIG. 10 is an enlarged view illustrating a part of the bottom wall 44 in a direction opposite to the insertion direction D1. As illustrated in FIGS. 9 and 10, the cartridge 4 further includes a rib 500. The rib 500 is a protrusion formed at the adapter bottom wall 84. The rib 500 is positioned on a side in the direction opposite to the insertion direction D1 with respect to the supply section tip end portion 442*a*. The rib 500 protrudes in the −Z direction, which is a supply direction side with respect to the opening section 446 which is a liquid supply port of the liquid supply section 442.

Figure 11:
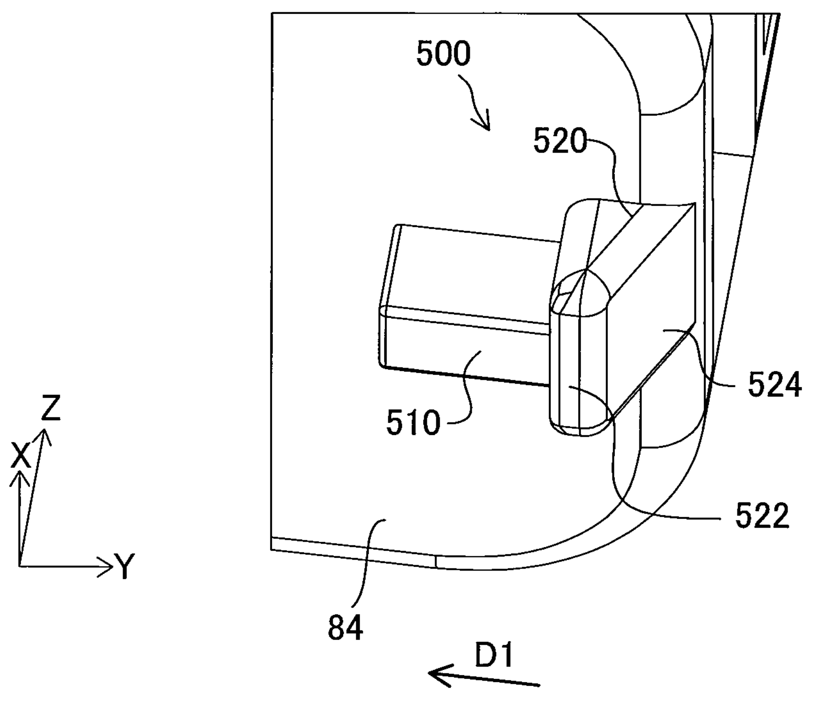
FIG. 11 is an enlarged view for describing a rib.

FIG. 11 is an enlarged view for describing the rib 500. As illustrated in FIGS. 10 and 11, the rib 500 has a rectangular parallelepiped portion 510 and a triangular prismatic portion 520. The rectangular parallelepiped portion 510 is a rectangular parallelepiped-shaped protrusion. The rectangular parallelepiped portion 510 presses a lever formed at the cartridge mounting section 6 in the insertion direction D1. The lever is a latch portion 900, which will be described later in the present embodiment. The rectangular parallelepiped portion 510 presses the latch portion 900 to release restriction between the latch portion 900 and the latch engaging portion 910. Details will be described later. The rectangular parallelepiped portion 510 is formed at an insertion direction D1 side of the rib 500.

Figure 12:
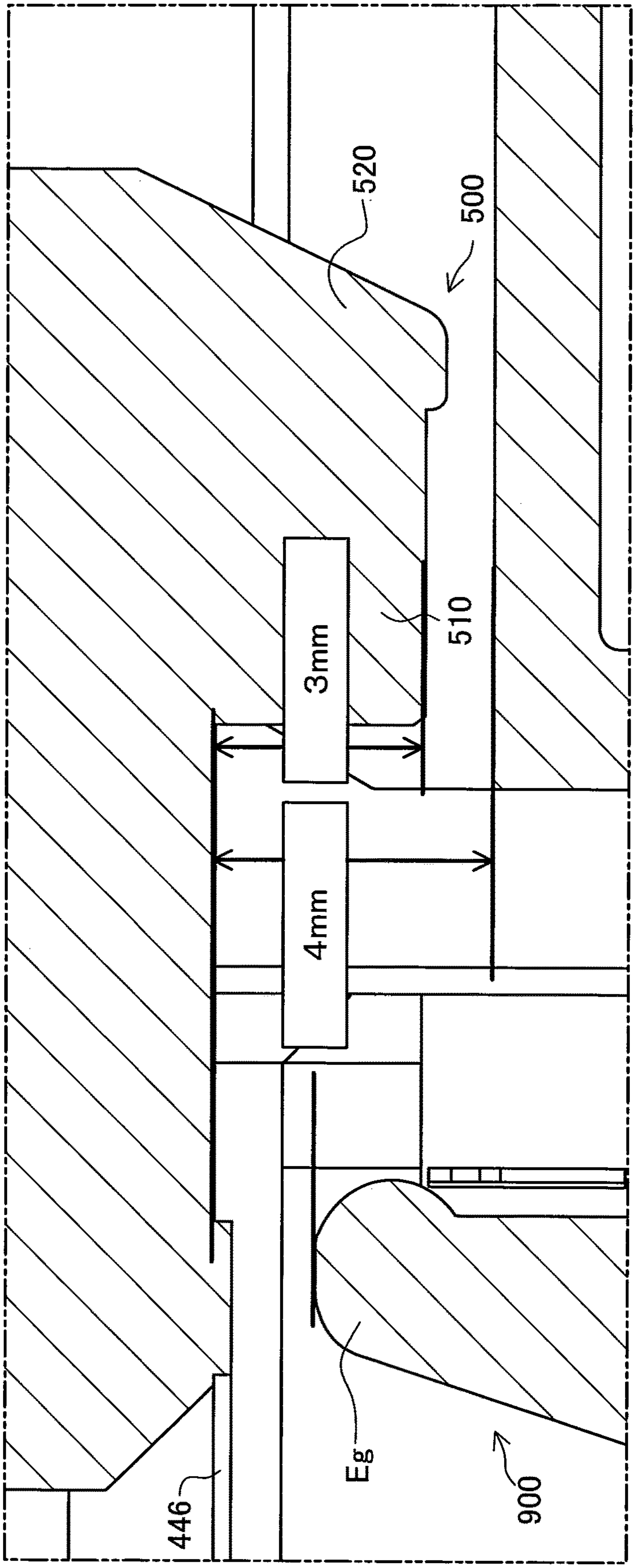
FIG. 12 is an explanatory view for describing a protrusion size of the rib.

FIG. 12 is an explanatory view for describing a protrusion size of the rib 500. In the present embodiment, a protrusion size of the rectangular parallelepiped portion 510 toward the supply direction side is 3 mm (millimeter) from the opening section 446 of the supply section tip end portion 442*a*. Further, a length of the rectangular parallelepiped portion 510 in the insertion direction D1 is 4.6 mm. Further, a length of the rectangular parallelepiped portion 510 in the X-axis direction, which is the width direction, is 2.5 mm. The protrusion size of the rectangular parallelepiped portion 510 toward the supply direction side is not limited to 3 mm from the opening section 446 of the supply section tip end portion 442*a*, and may be 3.5 mm. The protrusion size of the rectangular parallelepiped portion 510 toward the supply direction side need only be 0.5 mm or more. As illustrated in FIG. 12, the protrusion size of the rib 500 toward the supply direction side need only be 4 mm or less. When the protrusion size of the rectangular parallelepiped portion 510 toward the supply direction side is less than 0.5 mm, there is a possibility that the rectangular parallelepiped portion 510 cannot press the latch portion 900 without being caught on an end portion Eg of the latch portion 900 on a side in a direction opposite to a supply direction, which will be described later. Further, the length of the rectangular parallelepiped portion 510 in the insertion direction and the length of the rectangular parallelepiped portion 510 in the X-axis direction, which is the width direction, are not respectively limited to 4.6 mm and 2.5 mm, and any size may be used as long as the size is a moldable size.

As illustrated in FIG. 11, the triangular prismatic portion 520 is in contact with the rectangular parallelepiped portion 510 on a side in the direction opposite to the insertion direction with respect to the rectangular parallelepiped portion 510. The triangular prismatic portion 520 is a prismatic portion having a triangular shape when viewed in the X-axis direction. The triangular prismatic portion 520 is formed to have a size larger in the supply direction and in the width direction than the rectangular parallelepiped portion 510. The triangular prismatic portion 520 protects deformation of the rectangular parallelepiped portion 510. The triangular prismatic portion 520 projects in the −Z direction, which is the supply direction of a liquid, with respect to the rectangular parallelepiped portion 510. The projecting part is also referred to as a projecting portion 522. Further, the triangular prismatic portion 520 has a wider width in the X-axis direction than the rectangular parallelepiped portion 510. The rectangular parallelepiped portion 510 is positioned at the center of the width. The triangular prismatic portion 520 is a protrusion having an inclined surface 524. The inclined surface 524 is an inclined surface that is continuous from a tip end of the triangular prismatic portion 520 in the supply direction to an end portion of the adapter bottom wall 84 on the +Y direction side which is a side in the direction opposite to the insertion direction. By forming the inclined surface 524, the mounting engaging portion 697 slides and moves upward along the inclined surface 524 during vertical mounting of the cartridge 4, thereby it is possible to reduce a load and inhibit a rattling feeling during mounting.

Figure 13:
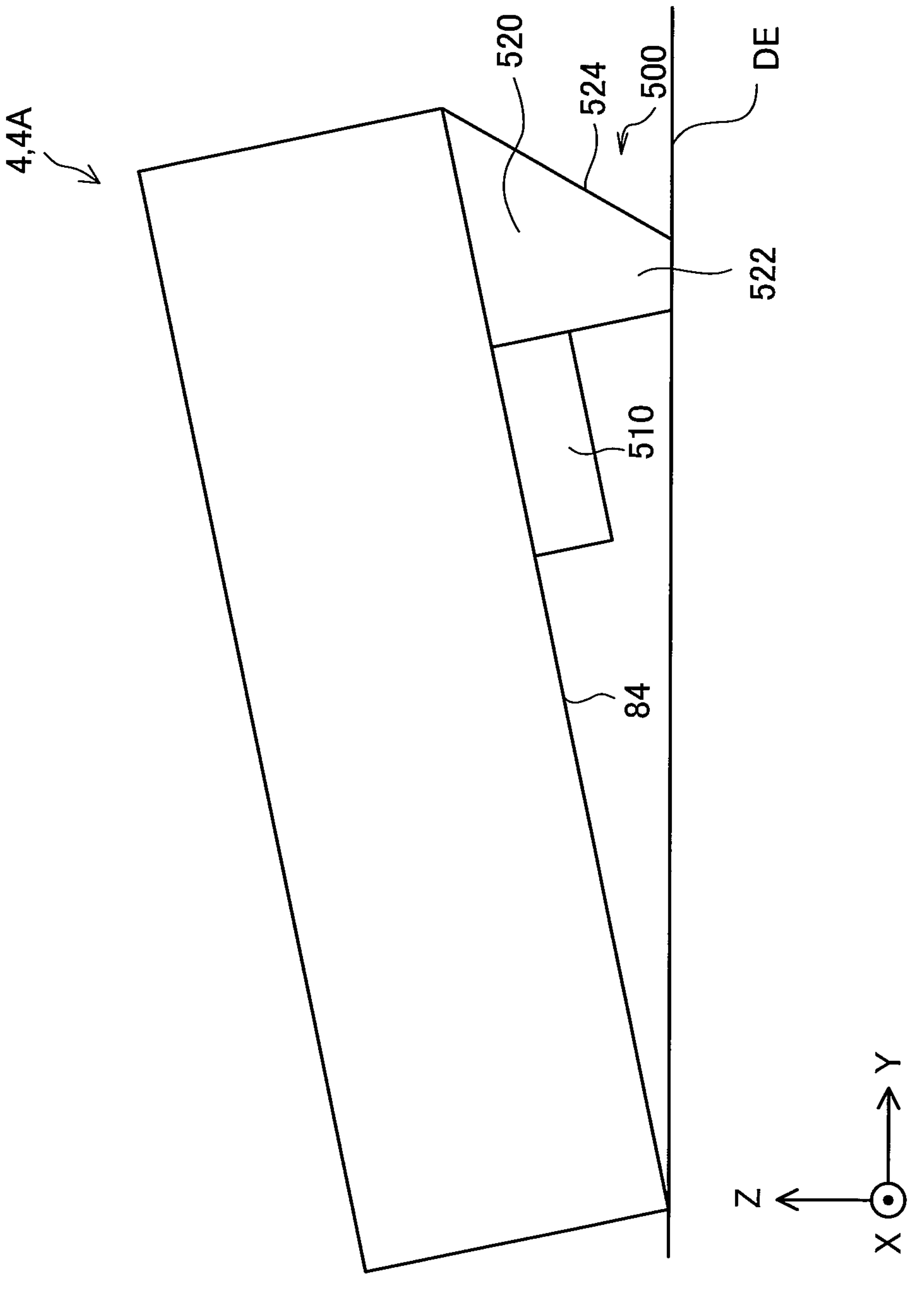
FIG. 13 is a schematic view of a state where the cartridge is disposed on a desk.

FIG. 13 is a schematic view of a state where the cartridge 4 is disposed on a desk DE. Even when the cartridge 4 falls onto the desk DE in a posture illustrated in FIG. 13 as a result of an impact applied from the outside or the like, since the projecting portion 522 of the triangular prismatic portion 520 touches the desk DE, it is possible to inhibit the opening section 446 from coming into contact with the desk DE and from being damaged, and accordingly, it is possible to avoid an occurrence of unexpected ink leakage. Further, as described above, since the triangular prismatic portion 520 is formed to have the size larger in the supply direction and the width direction than the rectangular parallelepiped portion 510, it is possible to protect the rectangular parallelepiped portion 510 and prevent deformation of the rectangular parallelepiped portion 510. By preventing the deformation of the rectangular parallelepiped portion 510 in this way, it is possible for the rectangular parallelepiped portion 510 to reliably press the latch portion 900 during horizontal insertion of the cartridge 4. Details will be described later.

A-5. Description of Mounting Process of Cartridge and Latch Portion

Figure 14:
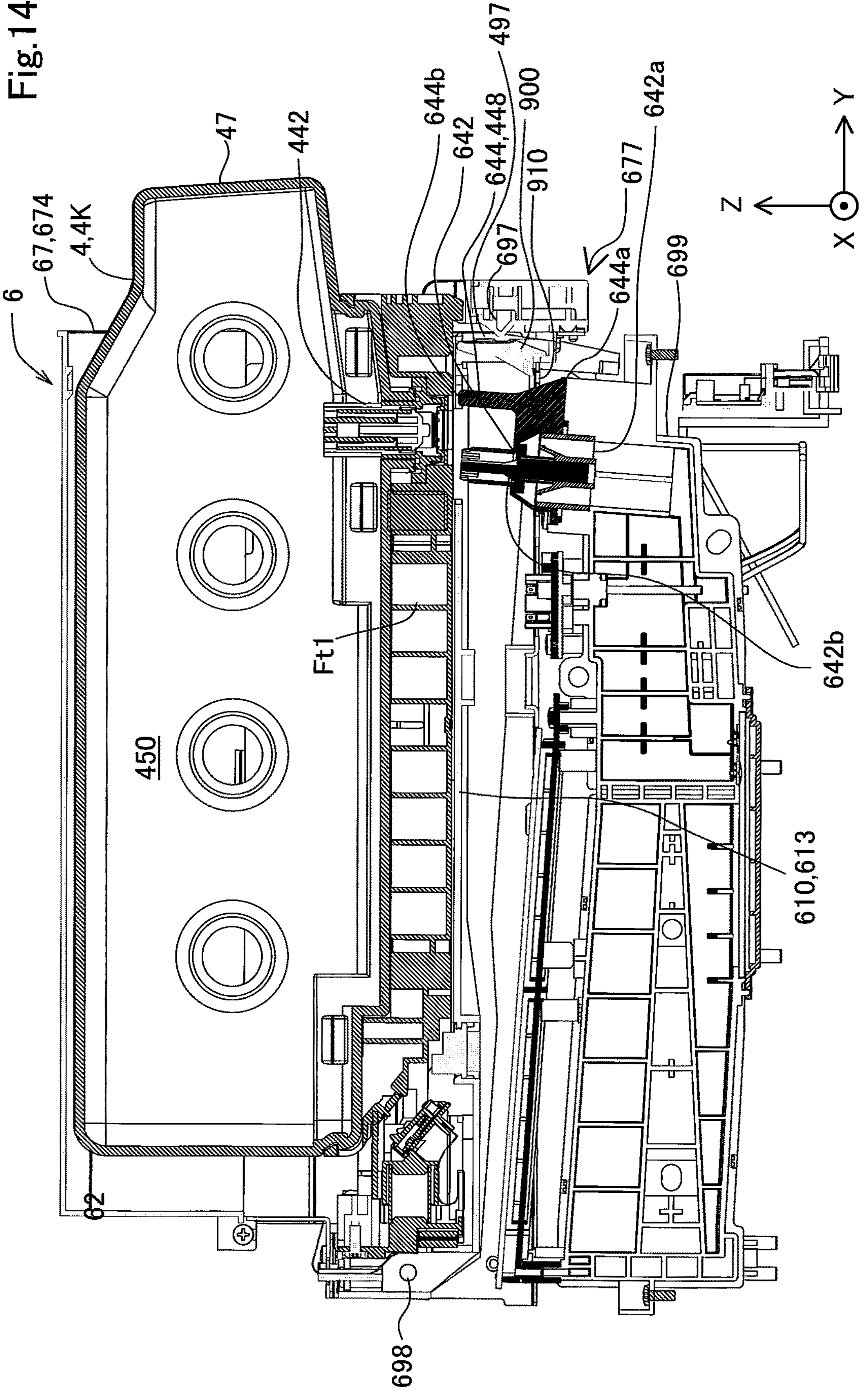
FIG. 14 is a cross-sectional view in the middle of horizontal mounting for describing the mounting of the cartridge.
Figure 15:
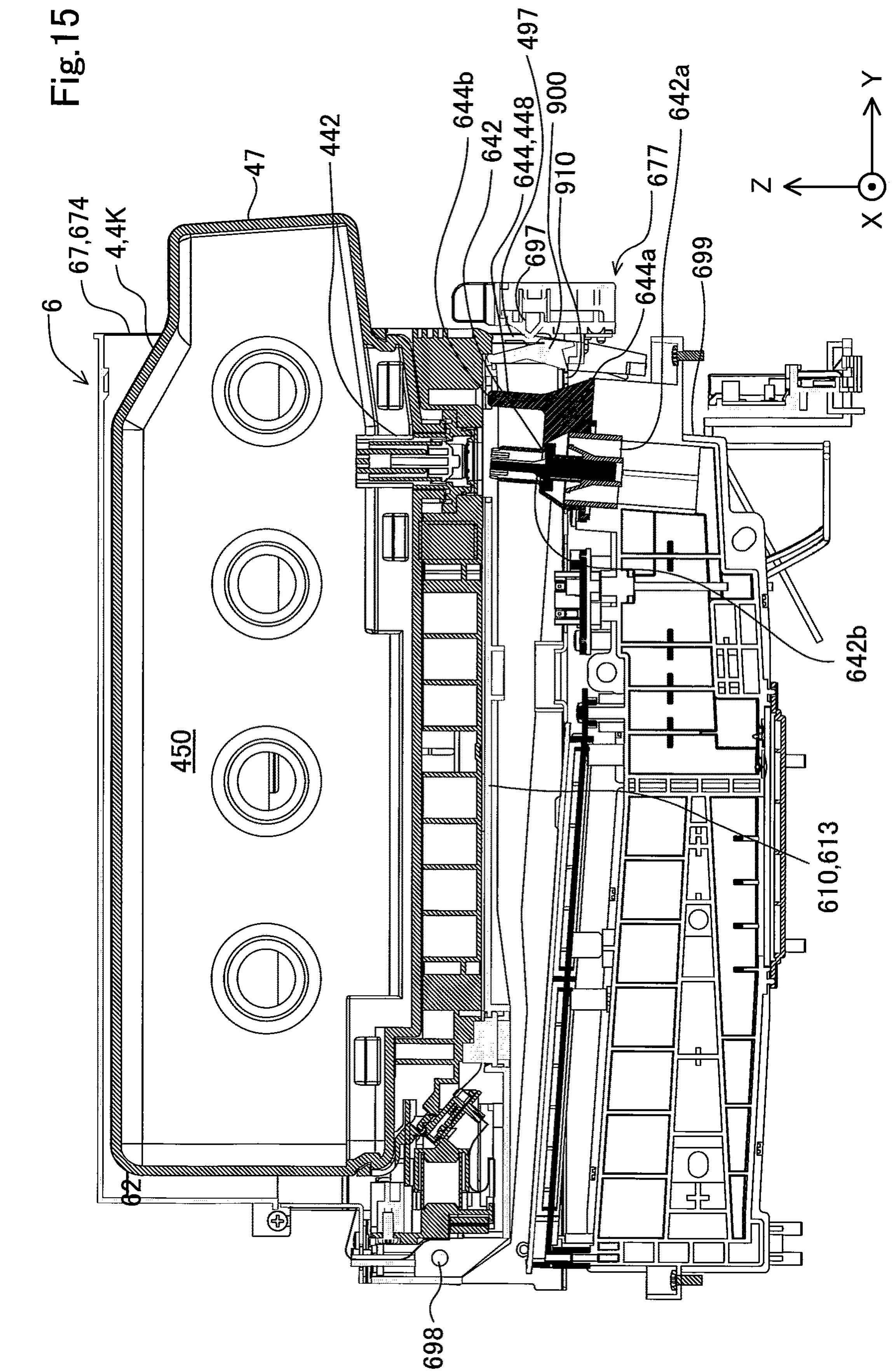
FIG. 15 is a cross-sectional view after the horizontal mounting for describing the mounting of the cartridge.
Figure 16:
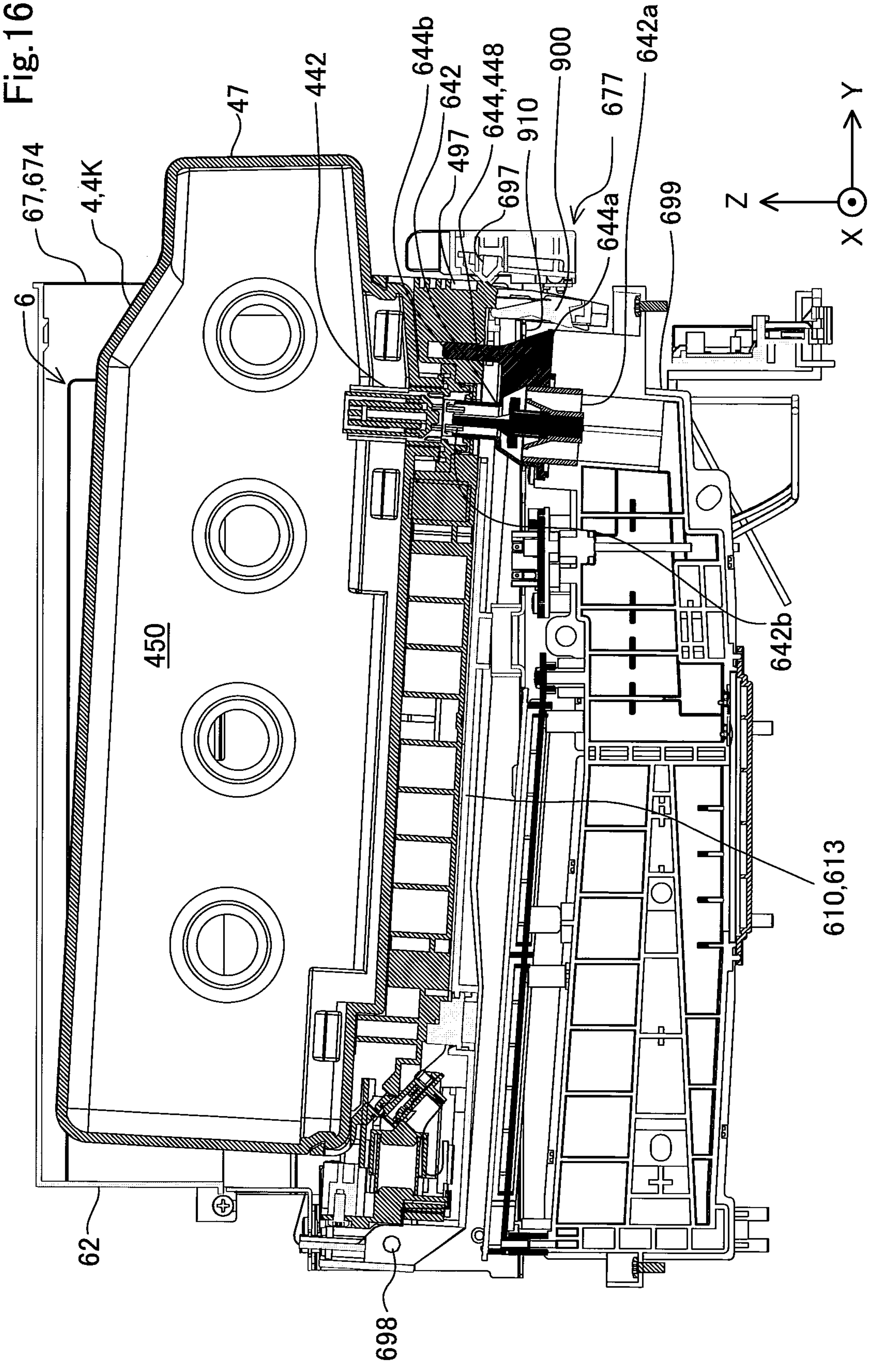
FIG. 16 is a cross-sectional view in the middle of vertical mounting for describing the mounting of the cartridge.

FIG. 14 is a cross-sectional view in the middle of horizontal mounting for describing the mounting of the cartridge 4. FIG. 15 is a cross-sectional view after the horizontal mounting for describing the mounting of the cartridge 4. FIG. 16 is a cross-sectional view in the middle of the vertical mounting for describing the mounting of the cartridge 4. As illustrated in FIGS. 14 to 16 and FIG. 6, the mounting of the cartridge 4 is completed in order of FIGS. 14, 15, 16, and 6. The direction in which the liquid supply section 442 extends is downward in a state where the cartridge 4 is inserted into the cartridge mounting section 6. The cartridge mounting section 6 has a latch portion 900 and a latch engaging portion 910.

Figure 19:
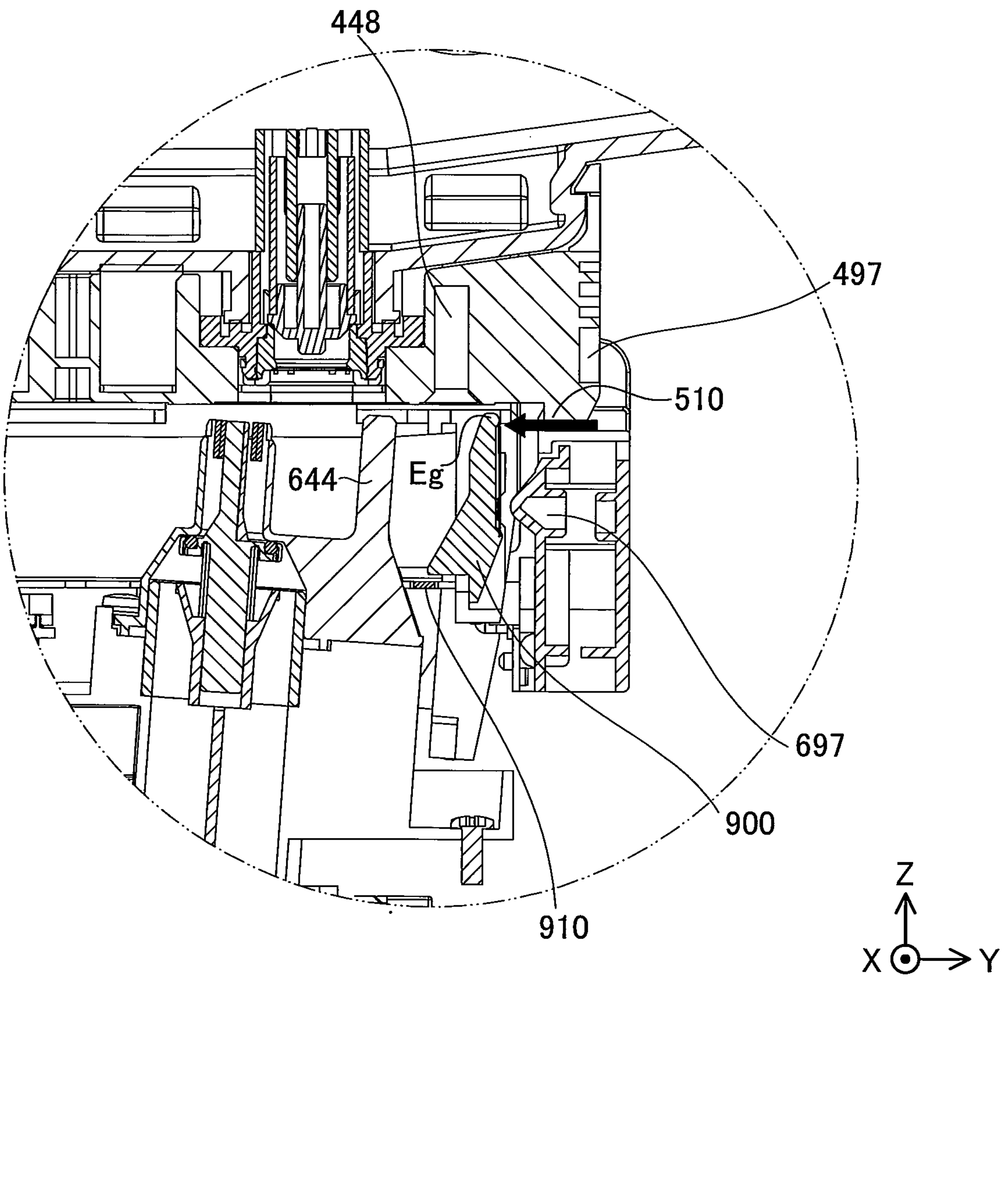
FIG. 19 is an enlarged view of a part of FIG. 14.
Figure 20:
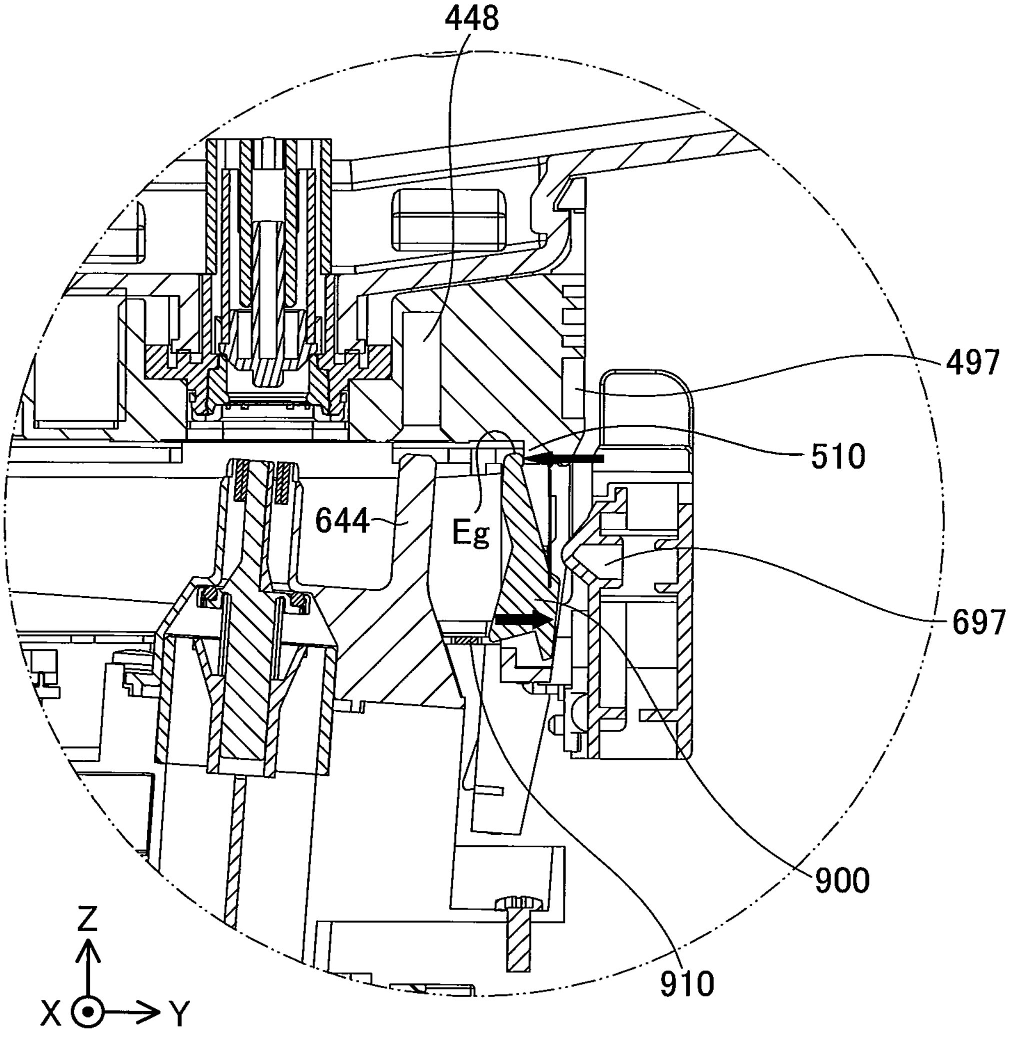
FIG. 20 is an enlarged view of a part of FIG. 15.
Figure 21:
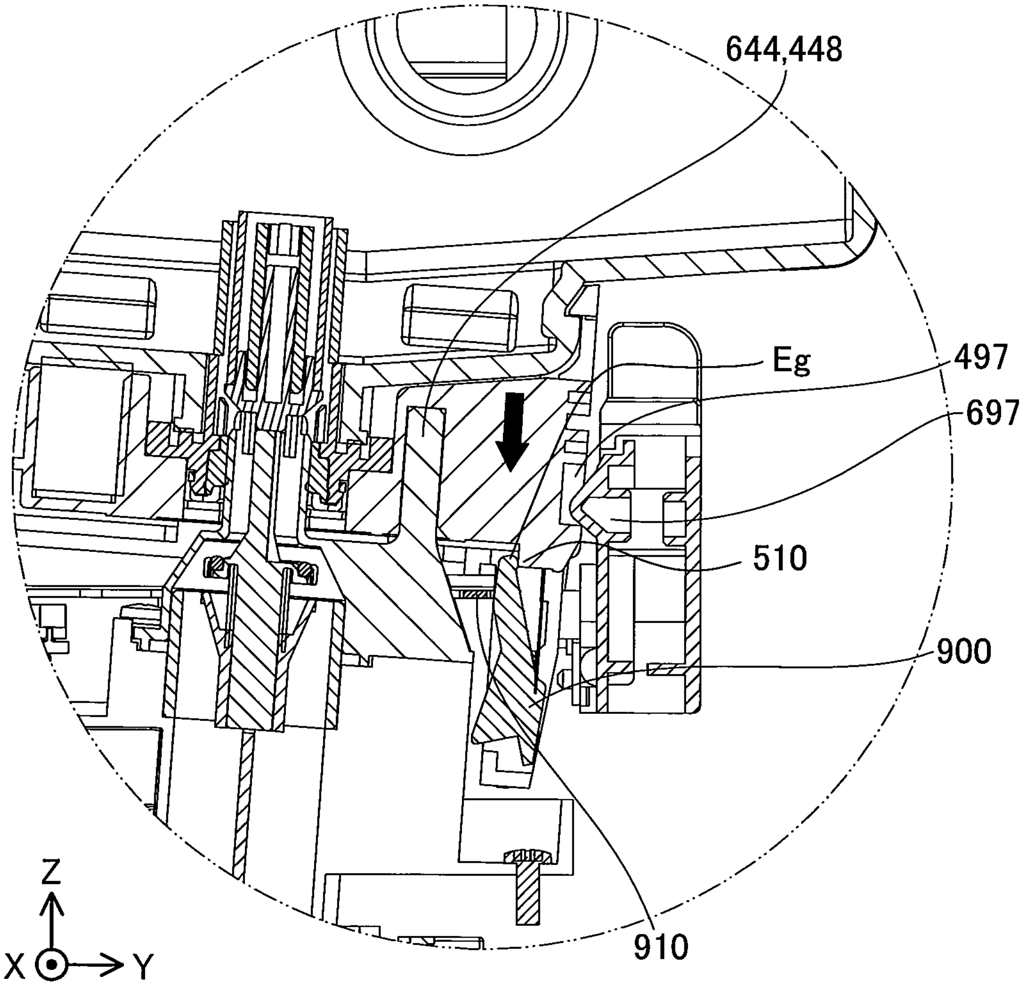
FIG. 21 is an enlarged view of a part of FIG. 6.

The latch portion 900 is biased in an upward direction by a biasing member such as a spring (not shown) and is at a position illustrated in FIG. 19. The latch portion 900 rotationally moves in a Y-Z direction as illustrated in FIG. 20 by the mounting of the cartridge 4 in the horizontal direction. The latch portion 900 is movable in the vertical direction, or in the Z-axis direction by the vertical mounting or detachment of the cartridge 4. As illustrated in FIG. 21, the latch portion 900 moves in a downward direction accompanying movement in the downward direction, which is the supply direction of the cartridge 4.

Figure 17:
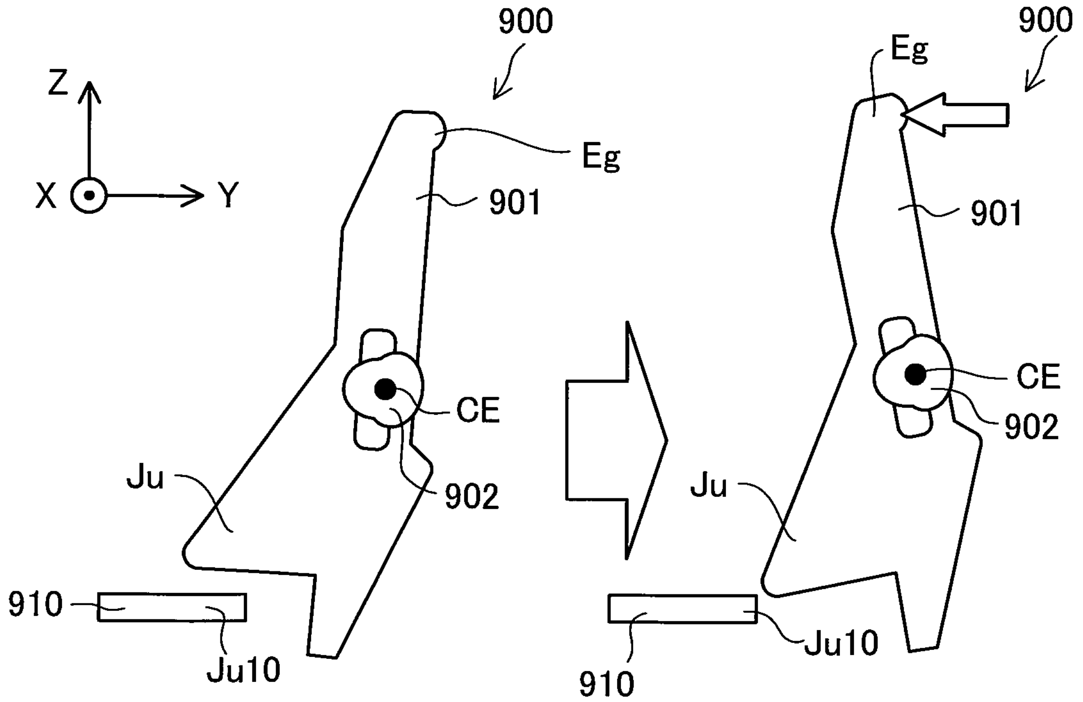
FIG. 17 is an explanatory view for describing a positional relationship between a latch portion and a latch engaging portion.
Figure 18:
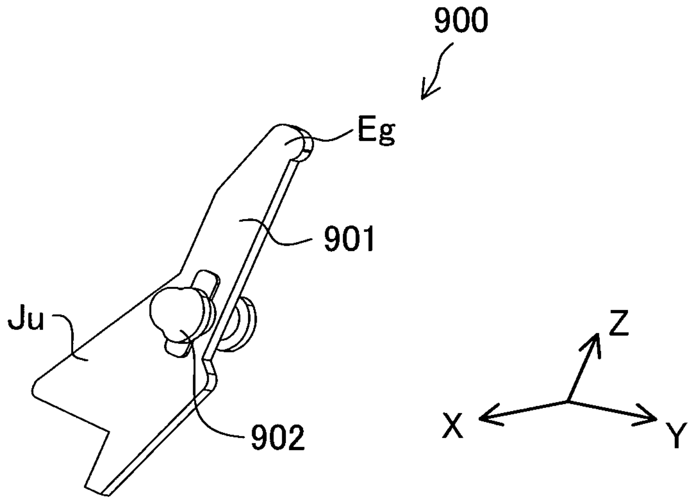
FIG. 18 is a perspective view of the latch portion.

FIG. 17 is an explanatory view for describing a positional relationship between the latch portion 900 and the latch engaging portion 910. FIG. 18 is a perspective view of the latch portion 900. As illustrated in FIGS. 17 and 18, the latch portion 900 has a thin plate-shaped member 901 and a rotation pin 902 inserted into a through-hole in a thickness direction formed at the member. As illustrated in FIGS. 17 and 18, the plate-shaped member has a schematic shape in which a direction substantially parallel to the Z-axis direction is a longitudinal direction when viewed in the X-axis direction, and has a restriction protrusion portion Ju, which is a part significantly protruding in the −Y direction, and a part slightly protruding in the +Y direction, at a position close to an end portion in the −Z direction. In the present embodiment, the latch portion 900 is formed of polypropylene. The latch portion 900 is not limited to polypropylene, and may be formed of another plastic.

FIG. 19 is an enlarged view of a part of FIG. 14. As illustrated in FIG. 19, the latch portion 900 is disposed at a position pressed by the rectangular parallelepiped portion 510 during the insertion of the cartridge 4 in the insertion direction. In the latch portion 900, the end portion Eg in the direction opposite to the supply direction is pressed by the rectangular parallelepiped portion 510. The latch portion 900 plays a role of preventing positional deviation of the cartridge 4 when the horizontal mounting and the vertical mounting of the cartridge 4 are performed. Details will be described later.

FIG. 20 is an enlarged view of a part of FIG. 15. FIG. 21 is an enlarged view of a part of FIG. 6. The latch engaging portion 910 illustrated in FIG. 17 and FIGS. 19 to 21 is a plate-shaped member having a substantially rectangular shape in a plan view in which the X-axis direction is a longitudinal direction. As shown on the left side in FIG. 17 and in FIG. 19, the latch engaging portion 910 is disposed at a position where the latch engaging portion 910 can be restricted together with the latch portion 900. Specifically, when the latch portion 900 is in a posture as illustrated in the left side of FIG. 17 and in FIG. 19, the latch engaging portion 910 can be restricted together with the restriction protrusion portion Ju, which is a tip end portion of the latch portion 900 in the −Y direction, in the Z-axis direction (supply direction and direction opposite thereto), in an engaging portion end portion Ju10, which is an end portion on a +Y direction side. That is, movement of the restriction protrusion portion Ju in −Z direction (supply direction) is restricted.

The end portion Eg of the latch portion 900 in the direction opposite to the supply direction (+Z direction) is pressed in the insertion direction (−Y direction) by the rectangular parallelepiped portion 510, so that the restriction between the latch portion 900 and the latch engaging portion 910 is released, as illustrated in the right side of FIG. 17 and in FIG. 20.

Specifically, when the latch portion 900 is in a posture as illustrated in the right side of FIG. 17 and in FIG. 20, the latch engaging portion 910 is released from the restriction together with the restriction protrusion portion Ju, which is the tip end portion of the latch portion 900 in the −Y direction, in the Z-axis direction, in the engaging portion end portion Ju10, which is an end portion on the +Y direction side. For the latch portion 900, the restriction on the movement in the supply direction, that is, downward movement is released in a state where the restriction with the latch engaging portion 910 is released. The restriction is in a released state in a state where the cartridge 4 is pressed in the insertion direction (−Y direction) and can no longer be pressed in the insertion direction, as illustrated in FIG. 20. In other words, the state is a state where the cartridge 4 is fully pressed as much as it can be inserted in the insertion direction. Further, as the cartridge 4 is pressed in the insertion direction (−Y direction) as described above, the supply section positioning section 448 slides in the insertion direction (−Y direction), and as illustrated in FIG. 20, a position of the supply section positioning section 448 and a position of the device-side supply section positioning section 644 coincide with each other in the Z-axis direction. Therefore, when the cartridge 4 is in a state of being pressed to the maximum extent that the cartridge 4 can be inserted in the insertion direction (−Y direction), the downward restriction of the latch portion 900 is released, so that the cartridge 4 itself can move downward while pressing the latch portion 900 downward. In addition, since the position of the device-side supply section positioning section 644 and the position of the supply section positioning section 448 coincide with each other in the Z-axis direction, the device-side supply section positioning section 644 and the supply section positioning section 448 can be fitted. More specifically, when the cartridge 4 moves downward, which is in the supply direction, due to the vertical mounting of the cartridge 4, the latch portion 900 moves downward as illustrated in FIG. 21 accompanying the downward movement. Further, the mounting engaging portion 697 moves upward along the inclined surface 524 and engages with the cartridge engaging portion 497. In this way, the normal mounting of the cartridge 4 is completed while preventing the positional deviation of the cartridge 4.

The "opening section 446" in the present embodiment corresponds to a "liquid supply port" in claims. Further, the "rectangular parallelepiped portion 510" in the present embodiment corresponds to a "first protrusion portion" in claims. Further, the "triangular prismatic portion 520" in the present embodiment corresponds to a "second protrusion portion" in claims. Further, the "latch portion 900" in the present embodiment corresponds to a "lever" in claims, and the "latch engaging portion 910" in the present embodiment corresponds to a "lever engaging portion" in claims.

According to the above embodiment, since the rib 500 protruding toward the supply direction side is formed at the adapter bottom wall 84, it is possible to inhibit the vicinity of the opening section 446 from being damaged by an external impact or the like when the cartridge 4 is handled, for example, when the cartridge 4 is placed on a table. As a result, it is possible to prevent unexpected ink leakage.

Further, the rib 500 is positioned on the side in the direction opposite to the insertion direction D1 with respect to the liquid supply section 442, and protrudes to the supply direction side with respect to the opening section 446, which is the liquid supply port of the liquid supply section 442. Therefore, by clearly specifying the position of the rib 500 and the protruding direction of the rib 500, it is possible to make the effect of the rib 500 in inhibiting the vicinity of the opening section 446 of the liquid supply section 442 from being damaged more remarkable.

Further, the protrusion size of the rectangular parallelepiped portion 510 toward the supply direction side is 3 mm from the opening section 446 of the supply section tip end portion 442*a*. Therefore, it is possible for the rectangular parallelepiped portion 510 to be caught on the end portion Eg of the latch portion 900 on the side in the direction opposite to the supply direction, and press the end portion Eg.

In addition, the adapter 402 is further formed with the cartridge guide portion 447 that extends along the insertion direction D1 and is guided in the insertion direction D1 by the cartridge mounting section 6, so that it is possible to dispose the cartridge guide portion 447 in the adapter 402.

Further, since the rib 500 has the rectangular parallelepiped portion 510 and the triangular prismatic portion 520 touching the rectangular parallelepiped portion 510 on the side in the direction opposite to the insertion direction D1 with respect to the rectangular parallelepiped portion 510, the shape of the rib 500 is specified.

Further, since the triangular prismatic portion 520 projects to the supply direction side and the width direction side with respect to the rectangular parallelepiped portion 510, even when the cartridge 4 falls onto the desk DE with the projecting portion 522 facing downward as a result of an impact applied from the outside or the like, the projecting portion 522 of the triangular prismatic portion 520 touches the desk DE. Therefore, it is possible to inhibit the opening section 446 from coming into contact with a desk or the like and from being damaged, and as a result, it is possible to avoid the occurrence of unexpected ink leakage.

Furthermore, since the triangular prismatic portion 520 further has the inclined surface 524 that is continuous from the tip end in the supply direction to the end portion of the adapter bottom wall 84 on the opposite direction side, the mounting engaging portion 697 slides and moves upward along the inclined surface 524 during vertical mounting of the cartridge 4, thereby it is possible to reduce the load and inhibit a rattling feeling during mounting.

Further, since the rib 500 presses the latch portion 900 formed at the cartridge mounting section 6 in the insertion direction D1 during the insertion of the cartridge 4 in the insertion direction D1, a function of the rib 500 of the cartridge 4 at the time of the mounting on the cartridge mounting section 6 is indicated.

Further, since the latch portion 900 is released from the restriction with the latch engaging portion 910, which is formed at the cartridge mounting section 6 and is disposed at the position where the latch engaging portion 910 can be restricted together with the latch portion 900, by being pressed in the insertion direction D1, a change in restriction condition between the latch portion 900 and the latch engaging portion 910 at the time of pressing the latch portion 900 in the insertion direction D1 is specified.

Further, it is possible to realize the printing system including the cartridge 4 and the printing device 10 having the cartridge mounting section 6.

Further, since the insertion direction D1 is parallel to the horizontal direction and the direction in which the liquid supply section 442 extends is downward in a state where the cartridge 4 is inserted into the cartridge mounting section 6, it is possible to reduce an amount of liquid in the liquid accommodating section 450 that remains without being consumed while improving the manipulability of the cartridge 4.

Since the cartridge mounting section 6 has the latch portion 900 at a position pressed by the rib 500 during the insertion of the cartridge 4 in the insertion direction D1, the latch portion 900 is reliably pressed by the rib 500 during the insertion of the cartridge 4 in the insertion direction D1.

Furthermore, the cartridge mounting section 6 further has a latch engaging portion 910 that is disposed at the position where the latch engaging portion 910 can be restricted together with the latch portion 900 and restricts the downward movement of the latch portion 900 in a state of being restricted together with the latch portion 900, and the latch portion 900 is released from the restriction with the latch engaging portion 910 by being pressed by the rib 500 in the insertion direction D1 and moves downward accompanying the downward movement of the cartridge 4. In a state where the latch portion 900 is pressed in the insertion direction D1 by the rectangular parallelepiped portion 510 and the restriction with the latch engaging portion 910 is released, the device-side supply section positioning section 644 and the supply section positioning section 448 can be fitted in the Z-axis direction. In contrast to this, in a state where the restriction between the latch portion 900 and the latch engaging portion 910 is not released, since the latch portion 900 cannot move downward, the cartridge 4 cannot move downward. Further, in a state where the restriction between the latch portion 900 and the latch engaging portion 910 is not released, the position of the device-side supply section positioning section 644 and the position of the supply section positioning section 448 do not coincide with each other in the Z-axis direction, and cannot be fitted. Accordingly, unless the cartridge 4 is inserted to a predetermined position in the horizontal direction, it is possible to prevent the user from performing the operation of lowering the cartridge 4 downward. Therefore, it is possible to inhibit the positional deviation of the cartridge 4, that is, erroneous mounting of the cartridge and avoid the occurrence of unexpected ink leakage.

B. OTHER EMBODIMENTS

B-1. Another Embodiment 1

Figure 22:
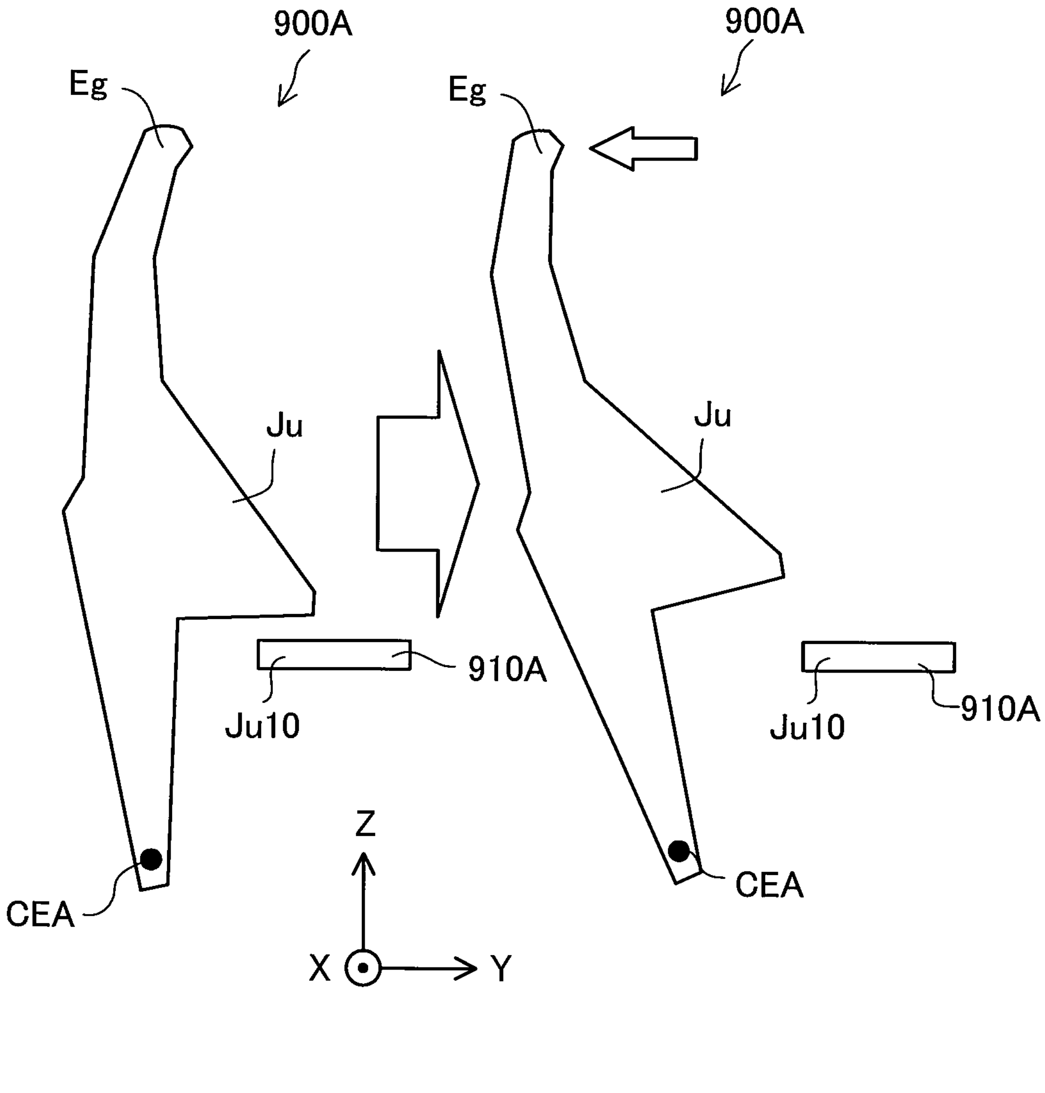
FIG. 22 is a view illustrating a positional relationship between a latch portion and a latch engaging portion according to Another Embodiment 1.

In the above embodiment, as illustrated in FIG. 17, the latch portion 900 is rotatable around the central axis CE of the center in the longitudinal direction of itself, but the present disclosure is not limited thereto. FIG. 22 is a view illustrating a positional relationship between a latch portion 900A and a latch engaging portion 910A according to Another Embodiment 1. As illustrated in FIG. 22, the latch portion 900A may be rotatable around a central axis CEA of an end portion in the −Z direction, which is the supply direction in the longitudinal direction. In this case, as shown in FIG. 22, A shape of the latch portion 900A and a positional relationship with respect to the latch engaging portion 910A have a configuration in which the latch portion 900 and the latch engaging portion 910 illustrated in FIG. 17 are inverted by 180 degrees. A length of the latch portion 900A from a longest part in the insertion direction to the end portion in the supply direction in FIG. 22 is longer than the length illustrated in FIG. 17, but any length may be used as long as the latch portion 900A can rotate to be released from restriction with the latch engaging portion 910A. Even in this case, the same effect as that in the above first embodiment can be obtained.

B-2. Another Embodiment 2

In the above embodiment, as illustrated in FIGS. 9 and 10, the rib 500 is formed at the end portion of the adapter bottom wall 84 on the side in the direction opposite to the insertion direction, but the present disclosure is not limited thereto. The rib 500 need not be formed at the end portion of the adapter bottom wall 84 on the side in the direction opposite to the insertion direction, as long as the latch portion 900 is pressed in the insertion direction by the rectangular parallelepiped portion 510, the restriction with the latch engaging portion 910 is released, and the device-side supply section positioning section 644 and the supply section positioning section 448 are at the position where the device-side supply section positioning section 644 and the supply section positioning section 448 can be fitted in the Z-axis direction. For example, the rib 500 may be formed between the end portion of the adapter bottom wall 84 at the side in the direction opposite to the insertion direction and the supply section positioning section 448.

B-3. Another Embodiment 3

In the above embodiment, as illustrated in FIG. 11, the rib 500 has the rectangular parallelepiped portion 510 and the triangular prismatic portion 520, but the present disclosure is not limited thereto. The rib 500 may have only the rectangular parallelepiped portion 510. In contrast to this, the rectangular parallelepiped portion 510 may be omitted, a configuration with only the triangular prismatic portion 520 may be employed, and the triangular prismatic portion 520 may have the function of the rectangular parallelepiped portion 510. In the configuration, an end surface of the triangular prismatic portion 520 in the −Y direction may be moved so as to be at the same position as an end surface of the rectangular parallelepiped portion 510 in the −Y direction illustrated in FIG. 11.

B-4. Another Embodiment 4

In the above embodiment, as illustrated in FIGS. 19 to 21, the latch portion 900 is released from the restriction with the latch engaging portion 910 by being pressed in the insertion direction by the rectangular parallelepiped portion 510, but the present disclosure is not limited thereto. For example, a configuration may be a mechanism in which, when the rib 500 enters the cartridge mounting section 6, a mechanical switch is pressed, and the restriction between the latch portion 900 and the latch engaging portion 910 is released.

B-5. Another Embodiment 5

In the above embodiment, the rectangular parallelepiped portion 510 has a rectangular parallelepiped shape, but the rectangular parallelepiped portion 510 may be a protrusion of any shape. In addition, the triangular prismatic portion 520 is a prismatic portion having a triangular shape when viewed in the X-axis direction, but may be a protrusion having any shape.

B-6. Another Embodiment 6

In the above embodiment, the triangular prismatic portion 520 has the inclined surface 524 that is continuous from the tip end of the triangular prismatic portion 520 in the supply direction to an end portion of the adapter bottom wall 84 on the +Y direction side which is the side in the direction opposite to the insertion direction, but the triangular prismatic portion 520 need not have the inclined surface.

B-7. Another Embodiment 7

The present disclosure is not limited to an ink jet printer and an ink cartridge thereof, and can be applied to a cartridge mounted on any printing device that ejects a liquid other than ink. For example, the present disclosure can be applied to various printing devices and cartridges thereof as follows.

(1) An image recording device such as a facsimile device
(2) A printing device ejecting a coloring material used for manufacturing a color filter for an image display device such as a liquid crystal display
(3) A printing device ejecting electrode material used for forming an electrode of an organic electro luminescence (EL) display, a surface emitting display (field emission display, FED), or the like
(4) A printing device ejecting a liquid containing a biological organic substance used for manufacturing a biochip
(5) A sample printing device as a precise pipette
(6) A printing device for lubricant
(7) A printing device for a resin liquid
(8) A printing device ejecting lubricant into a precise machine such as a timepiece or a camera in a pinpoint manner
(9) A printing device ejecting a transparent resin liquid such as an ultraviolet curable resin liquid onto a substrate for forming a micro hemispherical lens (optical lens) or the like used for an optical communication element or the like
(10) A printing device ejecting an acidic or alkaline etching solution to etch a substrate or the like
(11) A printing device including a liquid ejecting head for jetting any other minute amount of droplets A "droplet" refers to a state of a liquid jetted from a printing device, and includes granular one, tear-like one, or thread-like one as well as one having a tail. In addition, a "liquid" referred here need only be any material that can be ejected by a printing device. For example, a "liquid" need only be a material in a state at the time when a substance is in a liquid phase, and a "liquid" includes a liquid state material with high or low viscosity, sol, gel water, and other liquid state materials such as an inorganic solvent, an organic solvent, a solution, liquid resin, and liquid metal. Further, a "liquid" includes not only a liquid as a state of a substance but also a liquid in which particles of a functional material consisting of a solid substance, such as a pigment or a metal particle, are dissolved, dispersed, or mixed in a menstruum. In addition, a typical example of a liquid includes ink as in the above embodiment or a liquid crystal. Here, ink includes various liquid compositions such as general water-based ink and oil-based ink as well as gel ink and hot-melt ink.

C. OTHER ASPECTS

The present disclosure is not limited to the above-described embodiments, and can be realized in various configurations within the scope not departing from the concept of the present disclosure. For example, technical features in the embodiments corresponding to technical features in each aspect to be described below can be replaced or combined as appropriate to solve some or all of the problems described above, or to achieve some or all of the effects described above. In addition, when the technical features are not described herein as essential elements, the technical features can be appropriately deleted.

(1) According to a first aspect of the present disclosure, there is provided a cartridge mounted on a cartridge mounting section of a printing device having a liquid introduction section for receiving a liquid. The cartridge includes a liquid accommodating section configured to accommodate the liquid, a bottom wall on which a liquid supply section that is coupled to the liquid introduction section and supplies the liquid is disposed, and a rib formed at the bottom wall. According to the aspect, since the rib formed at the bottom wall is included, it is possible to inhibit the vicinity of an opening section of the liquid supply section from being damaged by an external impact or the like when the cartridge is handled, for example, when the cartridge is placed on a table. As a result, it is possible to prevent unexpected ink leakage.

(2) In the above aspect, the rib may be positioned, with respect to the liquid supply section, on a side in a direction opposite to an insertion direction in which the cartridge is inserted into the cartridge mounting section, and may protrude to a side in a supply direction with respect to a liquid supply port of the liquid supply section. According to the aspect, by clearly specifying the position of the rib and the protruding direction of the rib, it is possible to make the effect of the rib in inhibiting the vicinity of the opening section of the liquid supply section from being damaged more remarkable.

(3) In the above aspect, a protrusion size of the rib toward the side in the supply direction may be 0.5 mm (millimeter) or more and 4 mm or less from the liquid supply port. According to the aspect, the specific protrusion size from the liquid supply port is clarified.

(4) In the above aspect, a cartridge guide portion that extends along the insertion direction and is guided in the insertion direction by the cartridge mounting section may be formed. According to the aspect, it is possible to dispose the cartridge guide portion.

(5) In the above aspect, the rib may have a first protrusion portion, and a second protrusion portion that touches the first protrusion portion on the side in the opposite direction with respect to the first protrusion portion. According to the aspect, the shape of the rib is specified.

(6) In the above aspect, the second protrusion portion may project in a direction intersecting the insertion direction with respect to the first protrusion portion. According to the aspect, since a projecting part of the second protrusion portion touches a desk even when the cartridge falls onto the desk with the projecting part facing downward as a result of an impact applied from the outside or the like, it is possible to inhibit the liquid supply port from coming into contact with the desk or the like and from being damaged, and as a result, it is possible to avoid the occurrence of unexpected ink leakage.

(7) In the above aspect, the second protrusion portion may further have an inclined surface that is continuous from a tip end in the supply direction to an end portion of the bottom wall on the side in the opposite direction. According to the aspect, a mounting engaging portion of the cartridge mounting section slides and moves upward along the inclined surface during mounting of the cartridge, thereby it is possible to reduce a load and inhibit a rattling feeling during mounting.

(8) In the above aspect, the rib may press a lever formed at the cartridge mounting section in the insertion direction during insertion in the insertion direction in which the cartridge is inserted into the cartridge mounting section. According to the aspect, a function of the rib of the cartridge at the time of mounting on the cartridge mounting section is indicated.

(9) In the above aspect, the lever may be released from restriction with a lever engaging portion, which is formed at the cartridge mounting section and is disposed at a position where the lever engaging portion is configured to be restricted together with the lever, by being pressed in the insertion direction. According to the aspect, a change in restriction condition between the lever and the lever engaging portion at the time of pressing the lever in the insertion direction is specified.

(10) According to a second aspect of the present disclosure, there is provided a printing system. The printing system includes the cartridge of the above aspect, and a printing device having the cartridge mounting section. According to the aspect, it is possible to realize the printing system including the cartridge of the first aspect and the printing device having the cartridge mounting section.

(11) In the above aspect, the insertion direction in which the cartridge is inserted into the cartridge mounting section may be parallel to a horizontal direction, and a direction in which the liquid supply section extends may be downward in a state where the cartridge is inserted into the cartridge mounting section. According to the aspect, since the insertion direction is parallel to the horizontal direction and the direction in which the liquid supply section extends is downward in a state where the cartridge is inserted into the cartridge mounting section, it is possible to reduce an amount of liquid in the liquid accommodating section that remains without being consumed while improving the manipulability of the cartridge.

(12) In the above aspect, the cartridge mounting section may have a lever at a position where the lever is pressed by the rib during insertion of the cartridge in the insertion direction. According to the aspect, the disposition position of the lever is specified, and it is clarified that the lever is pressed by the rib during insertion of the cartridge in the insertion direction.

(13) In the above aspect, the cartridge mounting section may further have a lever engaging portion that is disposed at a position where the lever engaging portion is configured to be restricted together with the lever and restricts downward movement of the lever in a state of being restricted together with the lever, and the lever may be released from restriction with the lever engaging portion by being pressed by the rib in the insertion direction, and may move downward accompanying downward movement of the cartridge. According to the aspect, the lever can move downward in a state where the lever is pressed by the rib in the insertion direction and the restriction with the lever engaging portion is released. In contrast to this, in a state where the restriction between the lever and the lever engaging portion is not released, the lever cannot move downward, and thus the cartridge cannot move downward. Therefore, it is possible to inhibit positional deviation of the cartridge, that is, erroneous mounting of the cartridge and avoid an occurrence of unexpected ink leakage.

The present disclosure can be realized in an aspect such as a manufacturing method of a cartridge in addition to the above aspects.

REFERENCE SIGNS LIST

1 printing system
2 printing paper
4, 4C, 4K, 4M, 4Y cartridge
4A first type cartridge
4B second type cartridge
6 cartridge mounting section
8 cap member
10 printing device
13 replacement cover
15 manipulation button
20 carriage
22 jetting head
24 tube
30 driving mechanism
31 controller
32 timing belt
34 driving motor
41 cartridge main body
42 front wall
43 upper wall
44 bottom wall
45 first side wall
46 second side wall
47 rear wall
50 circuit substrate
54 first installation portion
55 second installation portion
61 accommodating chamber
61C slot
67 first device wall
70 device-side terminal section
73 holding mechanism
82 adapter front wall
84 adapter bottom wall
85 first adapter side wall
86 second adapter side wall
87 adapter rear wall
89 corner portion
90 terminal disposition portion
401 liquid accommodating body
402 adapter
430 cartridge-side identification member
431 accommodating body bottom wall
442 liquid supply section
442*a* supply section tip end portion
446 opening section
447 cartridge guide portion
447*a* first cartridge guide portion
447*b* second cartridge guide portion
448 supply section positioning section
450 liquid accommodating section
497 cartridge engaging portion
500 rib
510 rectangular parallelepiped portion
520 triangular prismatic portion
521 cartridge-side terminal
522 projecting portion
524 inclined surface
602 device guide portion
602*a* first device guide portion
602*b* second device guide portion
610 support member
613 main wall
625 biasing member
630 device-side identification member
642 liquid introduction section
642*a* base end
642*b* tip end
644 device-side supply section positioning section
644*a* one end portion
644*b* other end portion
674 insertion and removal opening section
677 engagement forming body
697 mounting engaging portion
698 rotation fulcrum
699 liquid storage section
700 mounting element

721 device-side terminal
739 connector
750 terminal holder
780 biasing member
782 installation member
831 supply section disposition portion
900, 900A latch portion
901 plate-shaped member
902 rotation pin
910, 910A latch engaging portion
CA1, CA2, CE, CEA central axis
D1 insertion direction
D2 coupling direction
D3 decoupling direction
E desk
Eg end portion
Fa, Ft1 external force
Ju restriction protrusion portion
Ju10 engaging portion end portion
R7 region
Rp terminal rotation fulcrum

The invention claimed is:

1. A cartridge mounted on a cartridge mounting section of a printing device including a liquid introduction section for receiving a liquid, the cartridge comprising:

a liquid accommodating section configured to accommodate the liquid;

a liquid supply section being coupled to the liquid introduction section and supplying the liquid; and a rib being positioned, with respect to the liquid supply section, on a side in a direction opposite to an insertion direction in which the cartridge is inserted into the cartridge mounting section, and protruding to a side in a supply direction with respect to a liquid supply port of the liquid supply section.

2. The cartridge according to claim 1, wherein a protrusion size of the rib toward the side in the supply direction is 0.5 mm (millimeter) or more and 4 mm or less from the liquid supply port.

3. The cartridge according to claim 1, wherein a cartridge guide portion that extends along the insertion direction and is guided in the insertion direction by the cartridge mounting section is formed.

4. The cartridge according to claim 1, wherein the rib includes a first protrusion portion, and a second protrusion portion that touches the first protrusion portion on the side in the opposite direction with respect to the first protrusion portion.

5. The cartridge according to claim 4, wherein the second protrusion portion projects in a direction intersecting the insertion direction with respect to the first protrusion portion.

6. The cartridge according to claim 5, wherein the second protrusion portion further includes an inclined surface that is continuous from a tip end in the supply direction to an end portion of a bottom wall on the side in the opposite direction.

7. The cartridge according to claim 1, wherein the rib presses a lever formed at the cartridge mounting section in the insertion direction during insertion in the insertion direction in which the cartridge is inserted into the cartridge mounting section.

8. The cartridge according to claim 7, wherein the lever is released from restriction with a lever engaging portion, which is formed at the cartridge mounting section and is disposed at a position where the lever engaging portion is configured to be restricted together with the lever, by being pressed in the insertion direction.

9. A printing system comprising:

the cartridge according to claim 1; and a printing device including the cartridge mounting section.

10. The printing system according to claim 9, wherein the insertion direction in which the cartridge is inserted into the cartridge mounting section is parallel to a horizontal direction, and a direction in which the liquid supply section extends is downward in a state where the cartridge is inserted into the cartridge mounting section.

11. The printing system according to claim 10, wherein the cartridge mounting section includes a lever at a position where the lever is pressed by the rib during insertion of the cartridge in the insertion direction.

12. The printing system according to claim 11, wherein the cartridge mounting section further includes a lever engaging portion that is disposed at a position where the lever engaging portion is configured to be restricted together with the lever and restricts downward movement of the lever in a state of being restricted together with the lever, and the lever is released from restriction with the lever engaging portion by being pressed by the rib in the insertion direction, and moves downward accompanying downward movement of the cartridge.

13. A cartridge configured to be mounted on a cartridge mounting section of a printing device including a liquid introduction section for receiving a liquid, the cartridge comprising:

a liquid accommodating section configured to accommodate the liquid;

a bottom wall on which a liquid supply section that is configured to be coupled to the liquid introduction section and to supply the liquid is disposed;

a rib formed at the bottom wall; and a recess recessed from an outer surface of the bottom wall and located between the liquid supply section and the rib, wherein the rib is positioned, with respect to the liquid supply section, on a side in a direction opposite to an insertion direction in which the cartridge is inserted into the cartridge mounting section, and protrudes to a side in a supply direction with respect to a liquid supply port of the liquid supply section.

14. A cartridge configured to be mounted on a cartridge mounting section of a printing device including a liquid introduction section for receiving a liquid, the cartridge comprising:

a liquid accommodating section configured to accommodate the liquid;

a bottom wall on which a liquid supply section that is configured to be coupled to the liquid introduction section and to supply the liquid is disposed; and a rib positioned, with respect to the liquid supply section, on a side in a direction opposite to an insertion direction in which the cartridge is inserted into the cartridge mounting section, and protruding below the bottom wall to a side in a supply direction with respect to a liquid supply port of the liquid supply section.

* * * * *